US010817538B2

(12) United States Patent
Cialdea, Jr. et al.

(10) Patent No.: US 10,817,538 B2
(45) Date of Patent: *Oct. 27, 2020

(54) DATA ANALYSIS ENGINE

(71) Applicant: AWARE, INC., Bedford, MA (US)

(72) Inventors: James Giulio Cialdea, Jr., Woburn, MA (US); Boshu Liu, Cambridge, MA (US)

(73) Assignee: AWARE, INC., Bedford, MA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/988,278

(22) Filed: May 24, 2018

(65) Prior Publication Data
US 2018/0268047 A1 Sep. 20, 2018

Related U.S. Application Data

(63) Continuation of application No. 15/612,486, filed on Jun. 2, 2017, now Pat. No. 10,002,176, which is a
(Continued)

(51) Int. Cl.
*G06F 16/00* (2019.01)
*G06F 16/28* (2019.01)
(Continued)

(52) U.S. Cl.
CPC .......... *G06F 16/283* (2019.01); *G06F 16/248* (2019.01); *G06F 16/26* (2019.01)

(58) Field of Classification Search
CPC ....... G06F 16/248; G06F 16/26; G06F 16/283
(Continued)

(56) References Cited

U.S. PATENT DOCUMENTS 5,608,849 A  3/1997 King, Jr.
6,807,518 B1  10/2004 Lang
(Continued)

OTHER PUBLICATIONS

Office Action for U.S. Appl. No. 14/337,650, dated Aug. 24, 2016.
(Continued)

*Primary Examiner* — Vincent F Boccio
(74) *Attorney, Agent, or Firm* — Jason H. Vick; Sheridan Ross, PC

(57) ABSTRACT

A system and method of analyzing data receives a user-specified selection of a data source, a user-specified selection of a type of data representation, and a user-specified description of a view to be constructed in accordance with the user-specified selection of the type of data representation. An application program interface (API) function generates a multidimensional query based on the user-specified type of data representation and the user-specified description of the view to be constructed, and submits the multidimensional query to the an On-line Analytical Processing (OLAP) server. The application program interface (API) function receives a multidimensional response from the OLAP server containing results acquired by the multidimensional query of the data source, and generates the view based on the results contained in the multidimensional response and in accordance with the user-specified selection of the type of data representation and the user-specified description of the view.

20 Claims, 18 Drawing Sheets

Related U.S. Application Data continuation of application No. 14/337,650, filed on Jul. 22, 2014, now Pat. No. 9,690,840.

(60) Provisional application No. 61/857,297, filed on Jul. 23, 2013.

(51) Int. Cl.
*G06F 16/26* (2019.01)
*G06F 16/248* (2019.01)

(58) Field of Classification Search
USPC ........................................................ 707/722
See application file for complete search history.

(56) References Cited

U.S. PATENT DOCUMENTS

| | | | |
|---|---|---|---|
| 6,878,114 B2 | 4/2005 | Murashita | |
| 7,363,287 B2 | 4/2008 | Kilmer et al. | |
| 7,665,843 B2 | 2/2010 | Xie | |
| 7,667,582 B1 | 2/2010 | Waldorf | |
| 8,219,547 B2 | 7/2012 | Joseph et al. | |
| 9,043,266 B2 | 5/2015 | Bauerle et al. | |
| 9,183,653 B2 | 11/2015 | Mital et al. | |
| 9,201,985 B2 | 12/2015 | Elias et al. | |
| 9,690,840 B2 * | 6/2017 | Cialdea, Jr. | G06F 16/283 |
| 10,002,176 B2 * | 6/2018 | Cialdea, Jr. | G06F 16/283 |
| 2004/0225648 A1 | 11/2004 | Ransom et al. | |
| 2005/0131924 A1 | 6/2005 | Jones | |
| 2009/0271729 A1 | 10/2009 | Killoren Clark et al. | |
| 2009/0282369 A1 | 11/2009 | Jones | |
| 2011/0196213 A1 | 8/2011 | Thukral et al. | |
| 2011/0208690 A1 | 8/2011 | Cushing et al. | |
| 2012/0148088 A1 | 6/2012 | Mital et al. | |
| 2013/0166498 A1 | 6/2013 | Aski et al. | |
| 2017/0270177 A1 | 9/2017 | Cialdea, Jr. et al. | |

OTHER PUBLICATIONS

Office Action for U.S. Appl. No. 14/337,650, dated Jan. 18, 2017.
Notice of Allowance for U.S. Appl. No. 14/337,650, dated Mar. 28, 2017.
Office Action for U.S. Appl. No. 15/612,486 dated Dec. 1, 2017.
Notice of Allowance for U.S. Appl. No. 15/612,486 dated Mar. 30, 2018.

* cited by examiner

FIG. 3

DATA ANALYSIS ENGINE

RELATED APPLICATION

This application is a Continuation of U.S. patent application Ser. No. 15/612,486, filed Jun. 2, 2017, now U.S. Pat. No. 10,002,176, which is a Continuation of U.S. application Ser. No. 14/337,650, filed Jul. 22, 2014, now U.S. Pat. No. 9,690,840, which claims the benefit of and priority to U.S. provisional application No. 61/857,297, filed Jul. 23, 2013, titled "Analysis Engine," each of which are incorporated herein by reference in their entirety.

FIELD OF THE INVENTION

The invention relates generally to multidimensional databases, and, in particular, to an application program interface for use by application programs to generate multidimensional queries of the databases and to produce reports from the returned search results.

BACKGROUND

Businesses and companies today store copious quantities of data in online transaction processing (OLTP) systems and other databases. On-Line Analytical Processing (OLAP) systems enable multidimensional analysis of the data in such databases. OLAP systems employ a conceptual model referred to as a cube. An OLAP cube is a multidimensional representation of data, in effect, a multidimensional OLAP database, which enables rapid analysis of data.

OLAP cubes are typically subject matter oriented. The data in a cube are organized as a set of dimensions. Dimensions correspond to categories of data analysis (e.g., date, equipment, device, location, etc.). Each dimension of a cube includes a number of members. The members may be organized into a hierarchy (e.g., country, state, city, street address). The multiple levels of a dimension enable multiple levels of aggregation by which to analyze the data. An OLAP cube also includes measures, which, generally, are metrics aggregated along dimensional hierarchies of the cube. For example, a cube may include a Total Sales measure for various products over various periods. In a cube, the measures are pre-aggregated.

An OLAP system may store any number of cubes of different subject matter having different numbers of dimensions with different hierarchical levels. Such OLAP cubes are built using dimensional modeling techniques. An OLAP system can derive a multidimensional cube by processing data from a relational database.

In an OLAP system, data can be aggregated across various dimensions at various levels to provide different views of the data at different levels of aggregation. Such aggregated data are commonly referred to as an aggregation. As an example, data may be aggregated by time, geography, equipment, and product. For instance, an aggregation may be the sales data for the month of December for a specified product. A slice typically comprises a level from each of the dimensions, and aggregations are typically associated with a slice.

End users can run application programs that connect to a cube for analyzing the data and reporting. An application may query an individual cell of the cube by identifying a member in each dimension and a measure. OLAP queries can retrieve data and request aggregations at various levels. If an aggregation is not presently available (e.g., the aggregation has not been pre-computed, or is out-of-date with respect to the underlying data), an OLAP server of the OLAP system may dynamically compute the aggregation in real-time. For example, the OLAP server may generate a relational database query to determine the cell value from an underlying relational database. An application need only understand the dimensions of the OLAP cubes and their hierarchies, and not the underlying physical implementation of the database schema used to store the data. An example of a query language for OLAP systems is Multidimensional Expressions (MDX) from Microsoft® Corp. of Redmond, Wash.

SUMMARY

In one aspect, the invention features a method of analyzing data comprising receiving a user-specified selection of a data source, a user-specified selection of a type of data representation, and a user-specified description of a view to be constructed in accordance with the user-specified selection of the type of data representation. An application program interface (API) function generates a multidimensional query based on the user-specified type of data representation and the user-specified description of the view to be constructed and submits the multidimensional query to an On-line Analytical Processing (OLAP) server for searching the data source. The application program interface (API) function receives a multidimensional response from the OLAP server containing results acquired by the multidimensional query of the data source. The view is generated based on the results contained in the multidimensional response and in accordance with the user-specified selection of the type of data representation and the user-specified description of the view.

In another aspect, the invention features a computer program product for analyzing data. The computer program product comprises a non-transitory computer readable storage medium having computer readable program code embodied therewith. The computer readable program code comprises: computer readable program code that, if executed, receives a user-specified selection of a data source; computer readable program code that, if executed, receives a user-specified selection of a type of data representation; computer readable program code that, if executed, receives a user-specified description of a view to be constructed in accordance with the user-specified selection of the type of data representation; computer readable program code that, if executed, generates a multidimensional query based on the user-specified type of data representation and the user-specified description of the view to be constructed; computer readable program code that, if executed, submits the multidimensional query to an On-line Analytical Processing (OLAP) server for searching the data source; computer readable program code that, if executed, receives a multidimensional reply from the OLAP server containing results acquired by the multidimensional query of the data source; and computer readable program code that, if executed, generates the view based on the results contained in the multidimensional response and in accordance with the user-specified selection of the type of data representation and the user-specified description of the view.

In still another aspect, the invention features a computer system for analyzing data. The computer system comprises memory storing program code used for analyzing data and generating reports and a processor executing the program code to receive a user-specified selection of a data source, a user-specified selection of a type of data representation, and a user-specified description of a view to be constructed in accordance with the user-specified selection of the type of data representation. The processor further executes the program code to generate a multidimensional query based on the user-specified type of data representation and the user-specified description of the view to be constructed, to submit the multidimensional query to an On-line Analytical Processing (OLAP) server, to receive a multidimensional reply from the OLAP server containing results acquired by the multidimensional query of the data source, and to generate the view based on the results contained in the multidimensional response and in accordance with the user-specified selection of the type of data representation and the user-specified description of the view.

BRIEF DESCRIPTION OF THE DRAWINGS

The above and further features and advantages may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 3 is an example of a screen display illustrating a view presented to a user corresponding to a second step for running a report.

DETAILED DESCRIPTION

Embodiments of reporting systems, described herein, facilitate report generation using a wizard-based approach that guides the user, step-by-step, through the report generation process. Such reporting systems are based on On-line Analytical Processing (OLAP) and dimensional modeling. A reporting application program asks the user to specify a data source, the type of data representation (e.g., histogram, line chart, etc.), and a description (e.g., content for the rows, column, x-axis, y-axis, etc.) of the view to be constructed in accordance with the user-specified selection of the type of data representation. An application program interface has functions for transforming the user-specified information into multidimensional queries of the OLAP system and for transforming the multidimensional responses to such queries received from the OLAP system into the specified view. Some views can include reference levels that provide context of the reported data to the user. Although the various principles described herein are in context of a Radiation Exposure Monitoring (REM) application, it is to be understood that such principles extend to other types of applications, such as biometric enrollment and/or biometric identification systems (e.g., fingerprinting systems).

Figure 1:
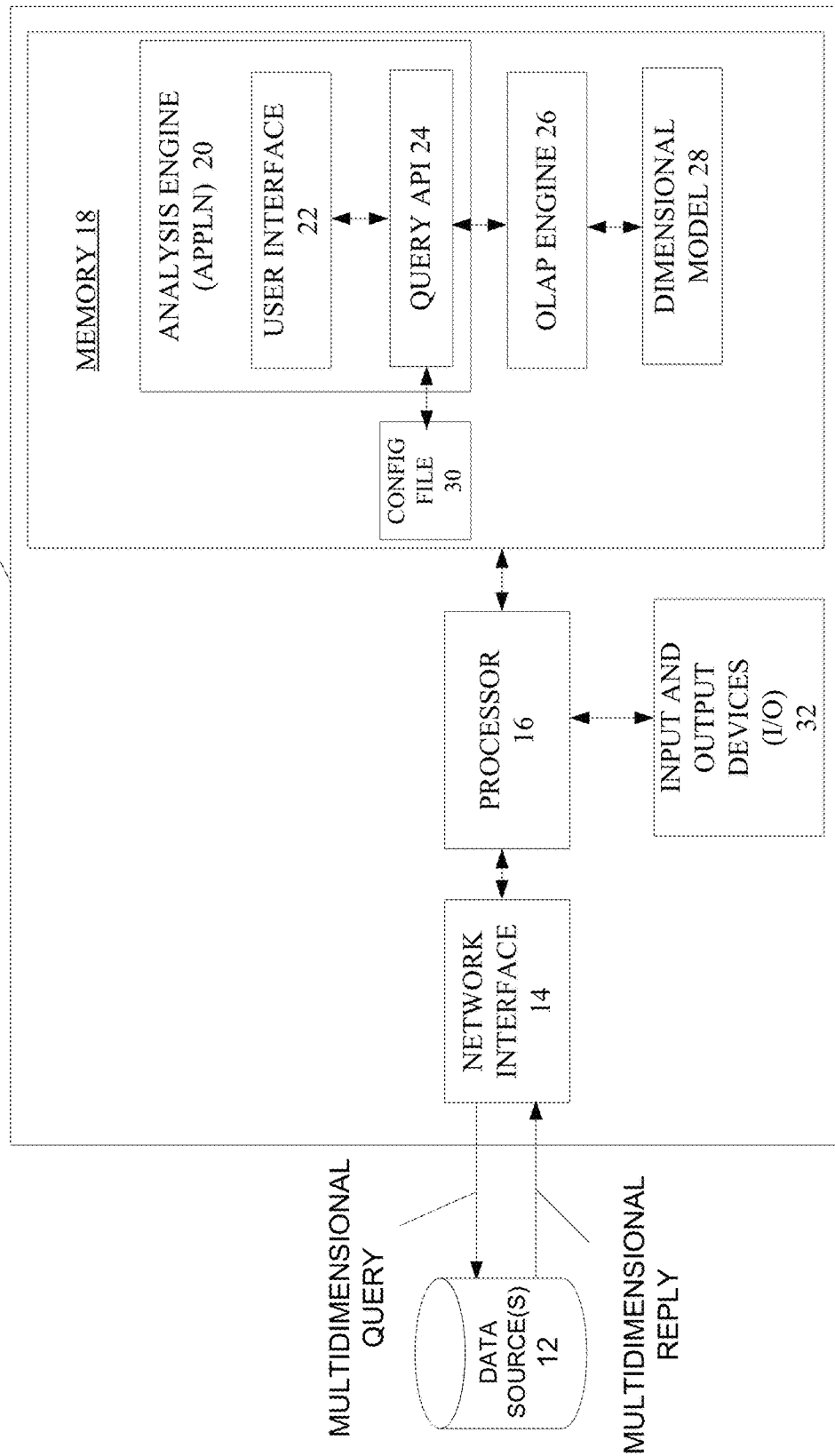
FIG. 1 is a block diagram of an embodiment of a computing system configured to analyze data and generate reports.

FIG. 1 shows an embodiment of a computing system 10 configured to provide a reporting system that analyzes data and generates reports, as described herein. The computing system 10 includes a network interface 14, a processor 16, and memory 18. Example implementations of the computing system 10 include, but are not limited to, personal computers (PC), Macintosh computers, server computers, blade servers, workstations, laptop computers, kiosks, hand-held devices, such as a personal digital assistant (PDA), mobile phones, smartphones, tablets, and network terminals.

The computing system 10 is in communication with one or more data sources (or data stores) 12 containing data organized in a multidimensional structure (e.g., cubes) that expresses the relationships between the data. The data sources 12 can also include the underlying data for the cubes. Such underlying data may be stored in a relational database. The cubes may be stored in a dimensional data store or in a relational database.

The network interface 14 is in communication with the one or more data sources 12 for sending multidimensional queries to and receiving multidimensional responses from the one or more data sources 12. The communication can be across a network (not shown), embodiments of which include, but are not limited to, local-area networks (LAN), metro-area networks (MAN), and wide-area networks (WAN), such as the Internet or World Wide Web. The computing system 10 can connect to one of the data sources 12 through one or more of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)). Although shown to be external to the computing system 10, the data sources 12 can be stored locally at the computing system 10, for example, stored in fixed or removable storage memory, such as hard disk drives, floppy drives, tape drives, removable memory cards, USBs, or optical storage.

The processor 16 is representative of a single central processing unit (CPU), multiple CPUs, or a single CPU having multiple processing cores. The processor 16 executes a data analysis program 20, also called an analysis engine (or data analysis application), stored in the memory 18. The memory 18 can be random access memory. Although shown as a single unit, the memory 18 may include a plurality of units or modules, of various speeds and different levels (e.g., cache).

The data analysis program 20 includes program code for providing a user interface 22. In brief, the user interface 22 guides a user, in step-by-step (i.e., "wizard") fashion, in the development and execution of a search of the one or more data sources 12. With each step, the user interface 22 provides hints and limits the user input. Through the user interface 22, a user specifies the data source to be queried and the type of data representation (e.g., histogram, line chart, etc.) to use when presenting the query results. The user also provides structural information (e.g., content for the rows, column, x-axis, y-axis, etc.) of the view being constructed in accordance with the specified type of data representation. Optionally, the user can also provide one or more content filters to be applied during the query.

The data analysis program 20 communicates with a query application program interface (API) 24 using, for example, XML/SOAP or JSON/JSON-RPC. The query API 24 has a plurality of different API functions (FIG. 10) configured to receive the user-specified information, namely, the data source, type of data representation, structural information, and any optional content filters, and to produce therefrom a multidimensional query. The query API 24 may considered part of the data analysis program 20, although other application programs can adopt the query API 24 for their own reporting and data analysis purposes.

An OLAP engine (or OLAP server) 26 provides a mapping between a dimensional model 28 and the underlying relational database, generating cubes from the underlying data (in a relational database) in accordance with the dimensional model 28 (each cube has a schema), and storing the cubes in the data source 12. The dimensional model 28 may organize the underlying data in a star-like schema, with numerical values stored in a fact (or base) table, with each numerical value referencing a dimension in a dimension table, and with each dimension table containing exactly one copy of each possible value. The fact table and dimension tables can be stored, for example, as multidimensional arrays or as relational tables. Cube definitions or schemas can be embodied by XML files. The OLAP server performs queries on these cubes.

One embodiment of the reporting system employs a Mondrian OLAP server, written in Java, to provide the OLAP engine 26 for retrieving data stored in relational databases. An embodiment of query language used for the Mondrian OLAP server is known as Multi-Dimensional Expression Query Language ("MDX"). The query API 24 can shield a user or an application program developer from having to know and understand the underlying MDX query language.

Each cube definition defines the name and contents of the cube, which columns are measures, which IDs reference which tables, the structure of each dimension and hierarchy, and default aggregations to be performed on each measure. These definitions enable the particular aggregations used by an application. In one embodiment, one or more of the defined cubes has at least one measure represented multiple times. Each representation of a particular measure corresponds to a different possible aggregation of that measure. Types of aggregations include standard deviation, variance, minimum value, maximum value, histogram, pie chart, sum, average, and count. Accordingly, if count, sum, average, and standard deviation values are available for calculation for a particular measure of a cube, that measure appears four times in the definition of the cube. In addition, OLAP server 26 may pre-calculate one or more aggregations defined for a cube by querying the underlying relational database, and store such pre-calculated aggregations in the cube, although various aggregations described herein, namely, histogram, pie chart, line chart, sum, average, min, max, count, and distinct count, are calculated in response to a submitted query.

Also stored in memory 18, a configuration file 30 defines a location of each cube schema and cube internationalization files. The configuration file 30 also defines a basic unit to be used for generating histograms and which measure of the cube supplies this basic unit.

The computer system 10 also includes an input and output (I/O) devices, represented generally as I/O 32. The I/O 32 can include any one or more devices for providing input to the computer system 10, for example, a touch-screen, a keyboard, a keypad, a track-ball, mouse. The I/O 32 can include any one or more devices for providing output to a user of the computer system 10, for example, a display screen with or without an integrated touch screen. Although shown together, input and output devices need not be combined in a single device.

Figure 2:
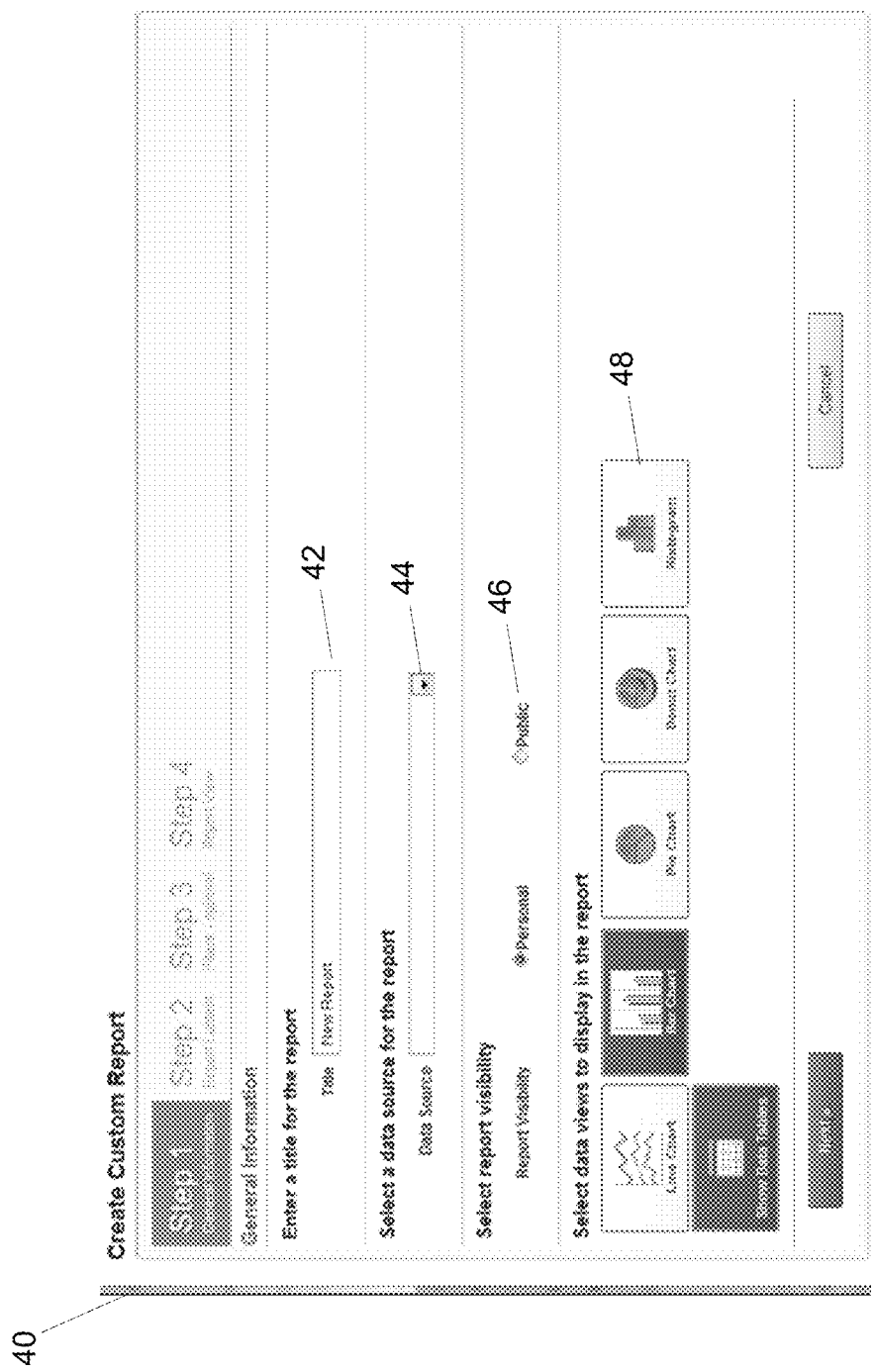
FIG. 2 is an example of a screen display illustrating a first screen presented to a user corresponding to a first step for running a report.

FIG. 2 shows an example of a screen display illustrating a first screen 40 presented to a user as the user interface 22 guides the user, step-by-step, in the development and execution of a search and consequent report. The first screen 40 asks the user to provide a title 42 for the report, a data source 44 for the report (options appear in a drop-down menu), an optional scope 46 of the report (e.g., private, public), and the type of view 48 used to display the retrieved results. In this example, the types of views 48 available are line charts, bar charts, pie charts, donut charts, and histograms. The user can also choose to see the data tables used to produce the particular view. Upon completion of this screen, the user moves to the next screen.

Figure 3:
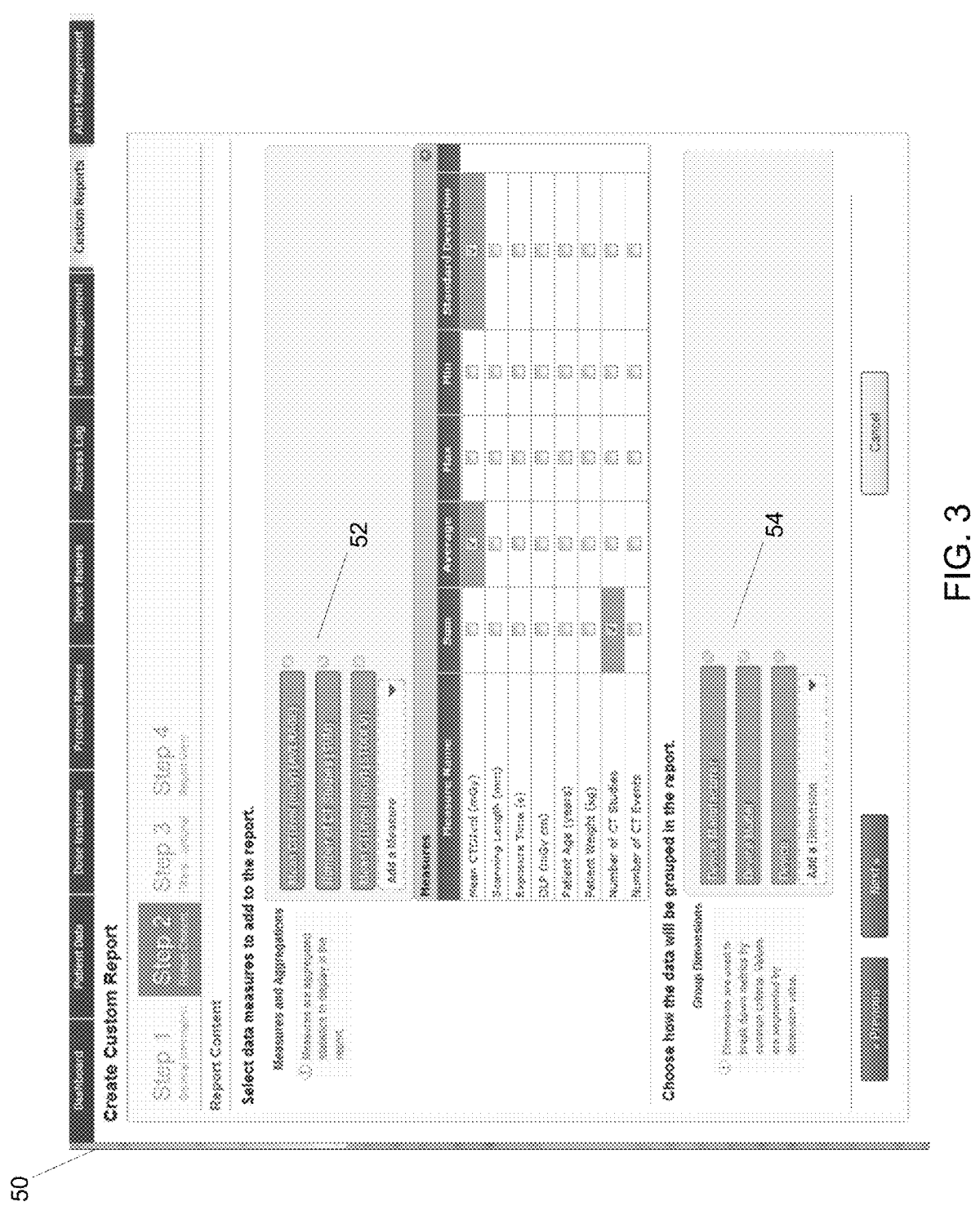

FIG. 3 shows an example of a screen display illustrating a view 50 presented to a user corresponding to a second step of the guided process for producing a report. This screen 50 requires the user to specify the content of the report, specifically, the measures and their aggregations 52 to be displayed in the report. Examples of measures include the size and weight of a patient, the radiation exposure time, the number of computerized topography (CT) scans, and the number of CT events. Examples of aggregations include sums, average, maximum, minimum, and standard deviation. Each selected measure corresponds to a numeric fact or statistic of interest for presenting in the report.

This screen 50 further requires the user to specify the dimensions 54 to be used to group the data in the report.

Dimensions operate to break down metrics by common criteria. Values returned for the report are separated by dimension values. Examples of dimensions include device manufacturer, device model, and device (in this embodiment, used to perform a CT scan). Upon completion of this screen, the user moves to the next screen.

Figure 4:
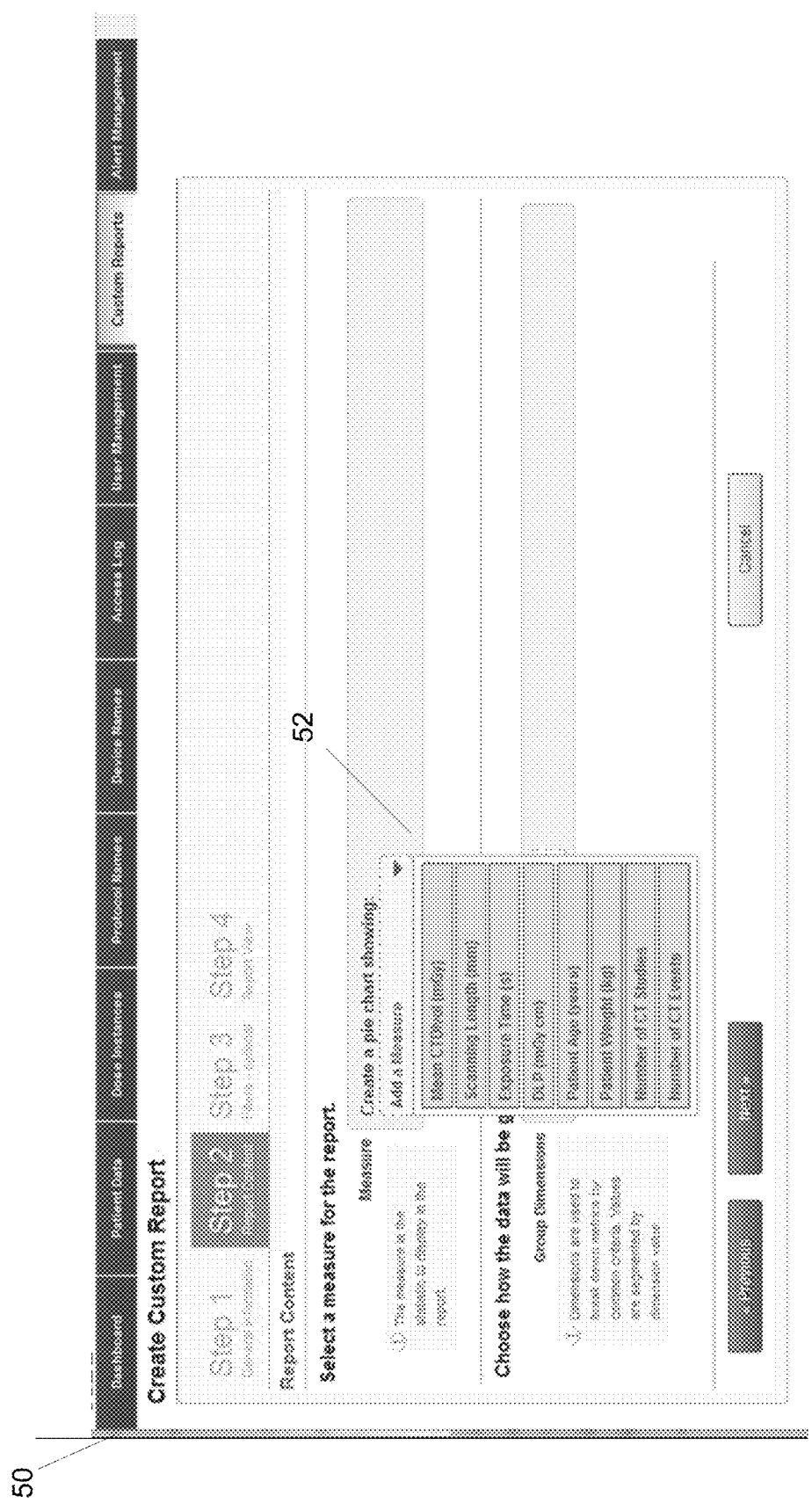
FIG. 4 is another example of a screen display illustrating a view presented to a user corresponding to a second step for running a report.

FIG. 4 shows an alternative example of a screen display illustrating the view 50 presented to a user corresponding to the second step for producing a report. In this example, the user specifies the measures 52 to be used in the generation of a pie chart. This alternative example illustrates that techniques can vary by which the user is asked to specify the content of the report.

Figure 5:
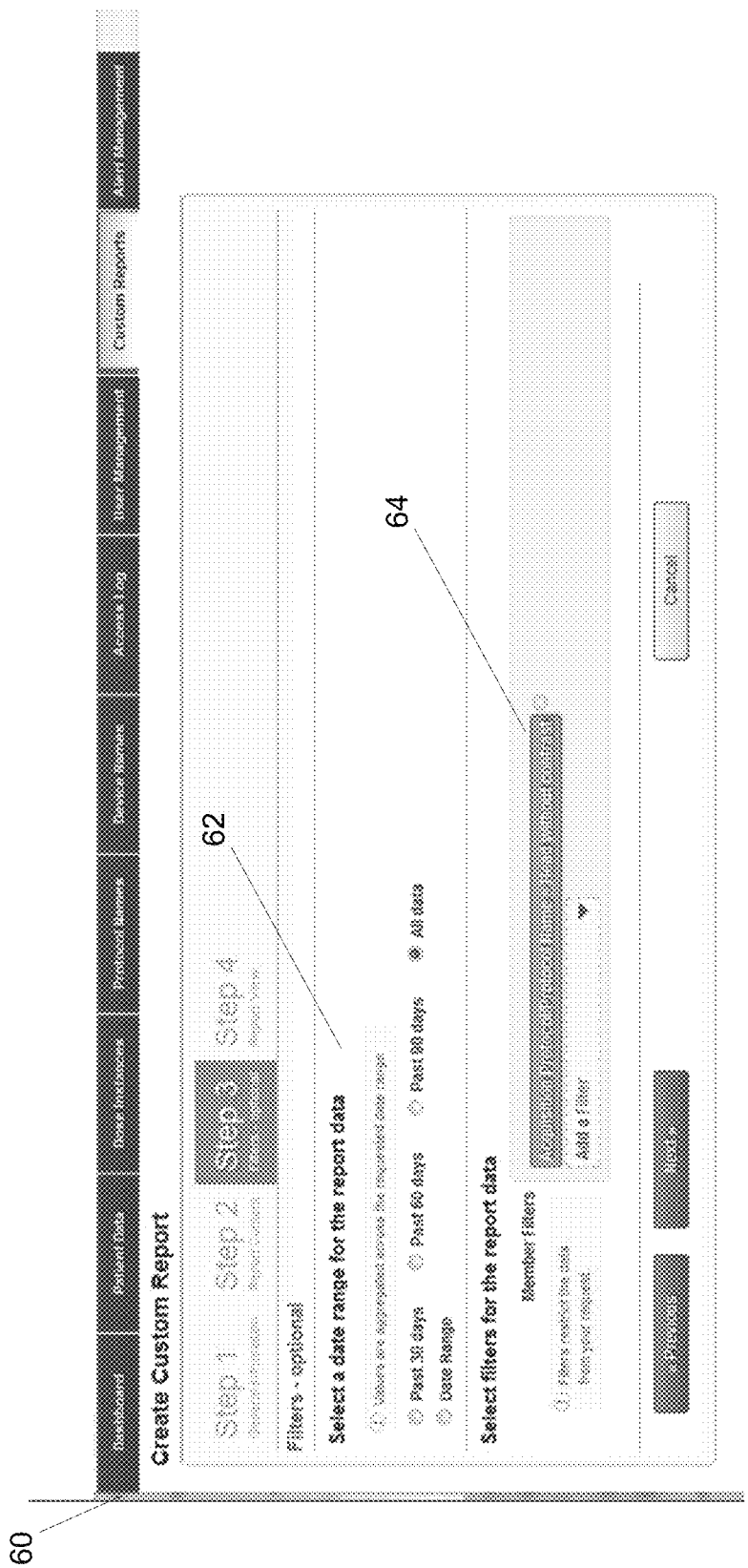
FIG. 5 is an example of a screen display illustrating a view presented to a user corresponding to a third step for running a report.

FIG. 5 is an example of a screen display illustrating a view 60 presented to a user corresponding to a third step for running a report. This screen 60 asks the user to specify one or more filters to be applied to the data used to generate the report. The filters can include specifying a date range 62 for the data and member filters 64. A member filter is a particular instance of a dimension upon which the report is to focus (by excluding data not satisfying the filter condition). The use of filters is optional, and the user can skip the third step.

Figure 6:
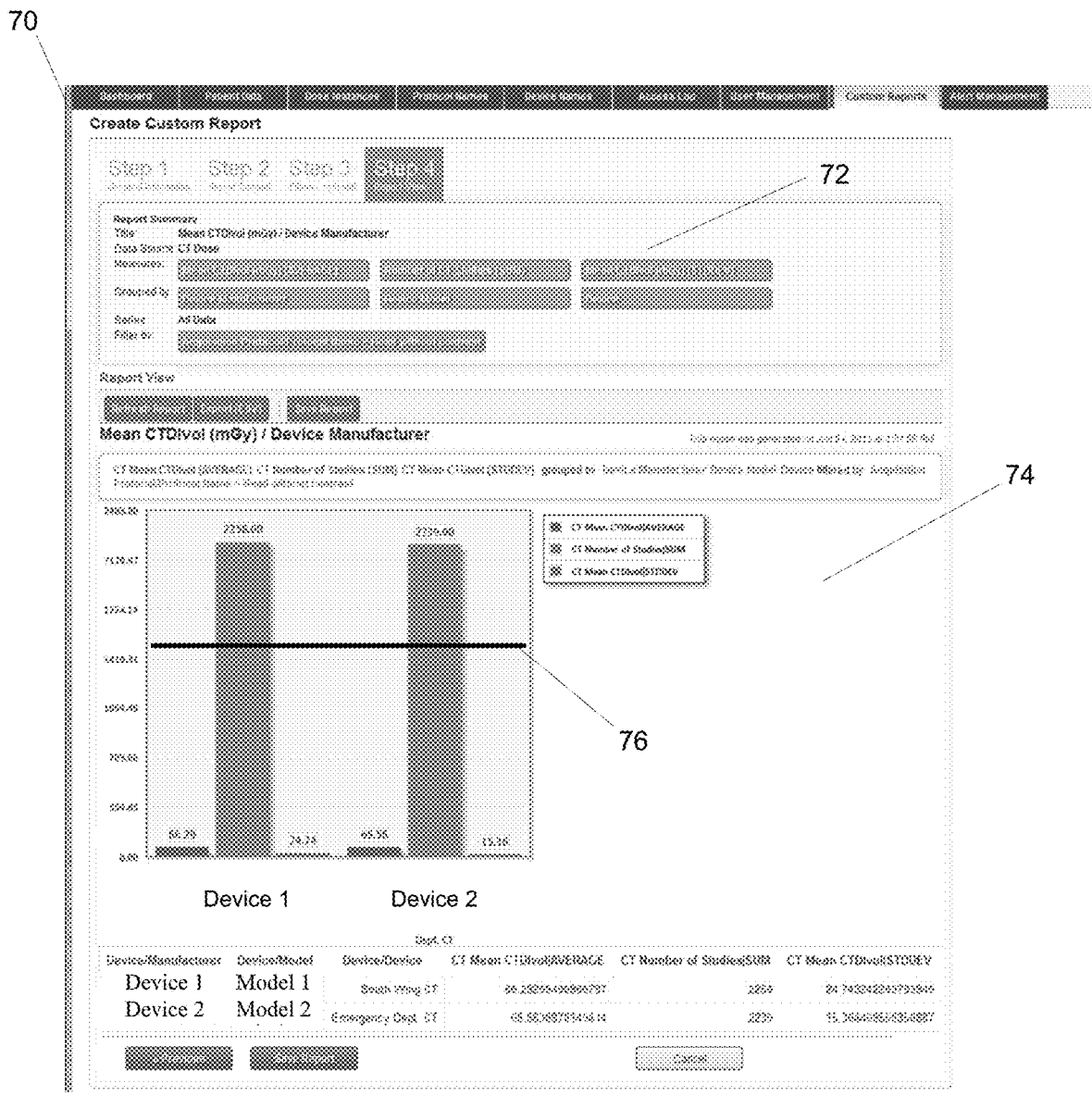
FIG. 6 is an example of a screen display illustrating a view presented to a user corresponding to a fourth step for running a report, wherein histogram results with a reference level are displayed to the user.

FIG. 6 shows an example of a screen display illustrating a view 70 presented to a user corresponding to a fourth step for producing a report. This screen 70 provides a report summary 72, identifying the title, data source, measures and aggregations, groupings, and filters, if any, used to produce the report. The graphical results 74 of the report are presented below the summary 72. In this example, the graphical results 74 include a bar chart, with an optional horizontal reference level 76 displayed to the user. The reference level 76 gives the user context for the measure values presented in the view, and can be used, for example, to trigger an alert for out of range measure values. In FIG. 6, the reference level has a global scope, namely, it is applicable to all bars of data displayed.

Figure 7:
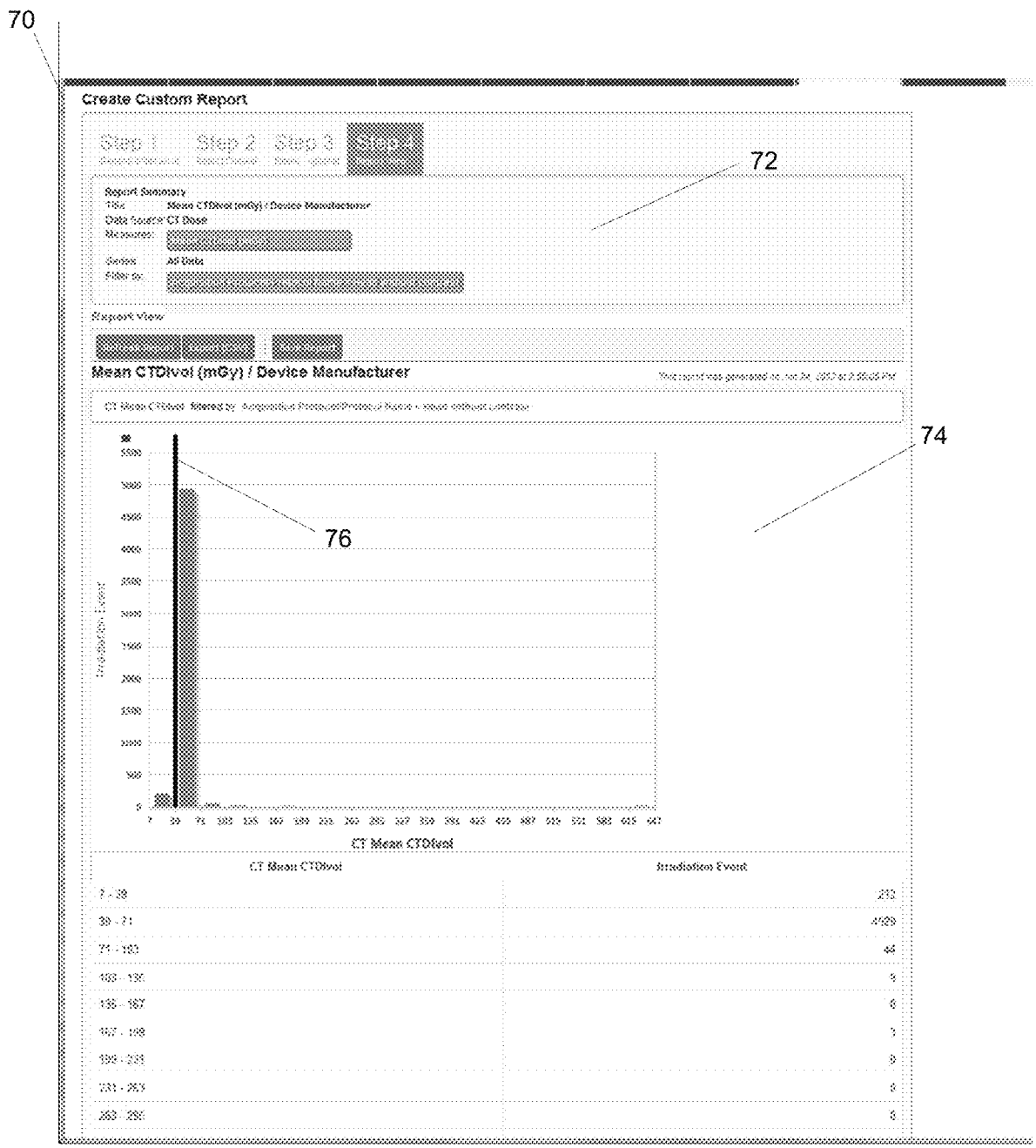
FIG. 7 is another example of a screen display illustrating a view presented to a user corresponding to a fourth step for running a report, wherein histogram results with a reference level are displayed to the user.

FIG. 7 shows another example of a screen display illustrating a view 70 presented to a user corresponding to the fourth step for generating a report. The report summary 72 identifies the data source (e.g., CT Dose cube), the measure (e.g., meanCTDIvol(mGy)), and filter (e.g., protocol: head with context) used to produce a histogram 74. An optional vertical reference level 76 is displayed on the histogram.

Figure 8:
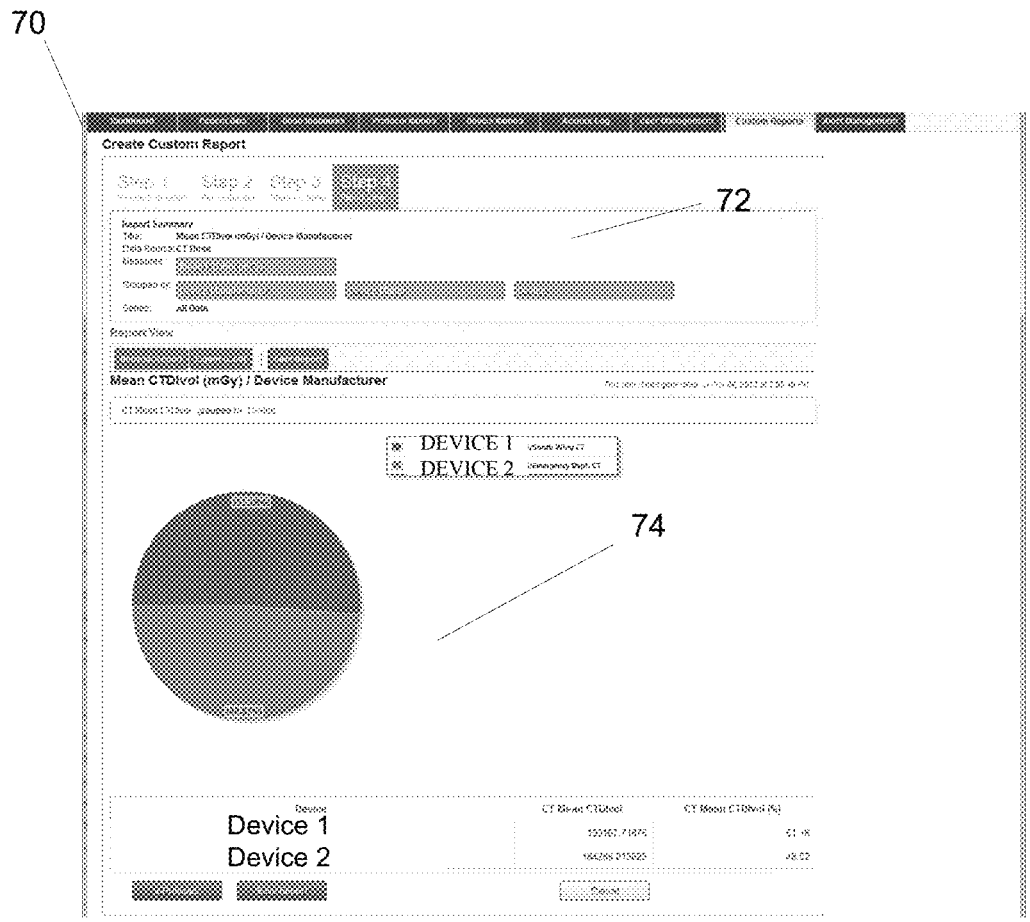
FIG. 8 is another example of a screen display illustrating a view presented to a user corresponding to a fourth step for running a report, wherein pie chart results are displayed to the user.

FIG. 8 shows yet another example of a screen display illustrating a view 70 presented to a user corresponding to the fourth step for generating a report. The report summary 72 identifies the measure (e.g., CTDIvol(mGy)) and groupings (here, e.g., three levels of selected dimensions), without any filter, used to produce a pie chart 74.

Figure 9:
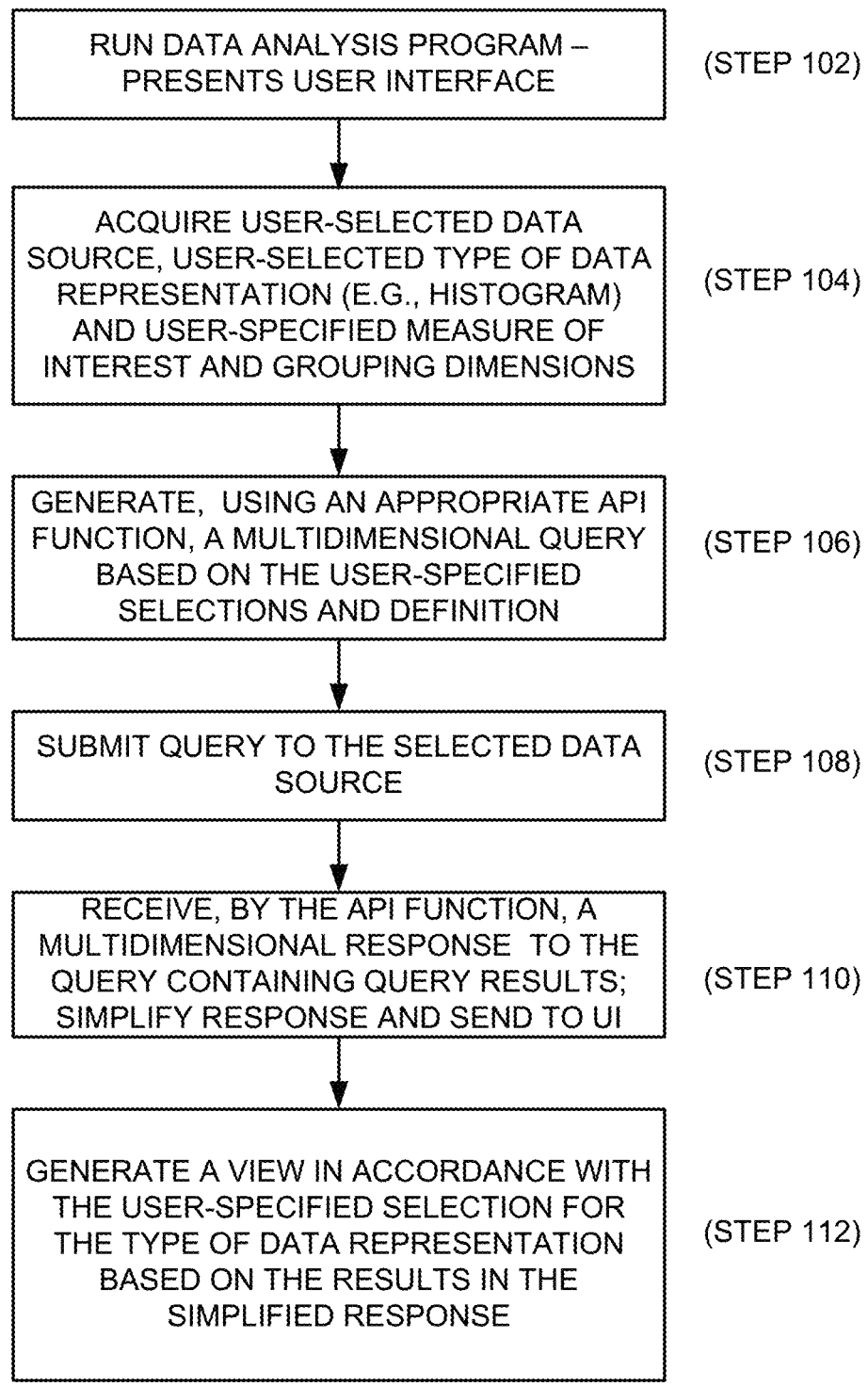
FIG. 9 is a flow diagram of an embodiment of a process for analyzing data and generating a report.

FIG. 9 shows an embodiment of a process 100 for analyzing data and generating a report. In the description of the process 100, reference may be made to the elements shown in FIG. 1. At step 102, a user starts execution of the data analysis program 20, which produces a user interface 22. The user interface 22 guides the user through a series of steps. In a first step, the user interface 22 requires the user to select a data source and a type of data representation. During a second step, the user interface 22 requires the user select one or more measures and one or more group dimensions. Each selected group dimension uses certain criteria to group the metrics or values obtained from the data source in connection with the selected measures. Measure metrics or values are segmented in the resulting view by these dimension criteria.

The user-specified data source, type of data representation, measure selection, and group dimension selection are acquired at step 104. To generate a multidimensional query based on the user-specified information, the user interface 22 calls one or more API functions of the query API 24. The particular API function(s) called depend upon the particular type of data representation (e.g., histogram, line chart) specified by the user. In the generation of the query, the called API function transforms the non-dimensional modeling terminology supplied by the user selections through the user interface 22 into dimensional modeling terminology (e.g., an MDX query) understood by the OLAP engine 26.

The OLAP engine 26 submits (step 108) the query to and receives (step 110) a multidimensional response from the specified data source 12. The response contains the results of the query. The previously called API function (used to generate the query) receives and simplifies the multidimensional response with the results, sending the simplified response to the user interface 22. To simplify the multidimensional response, the API function maps the dimensional modeling terminology of the multidimensional response into non-multidimensional terminology understood by the user interface 22. Then, based on the simplified response, the user interface 22 generates the view in the form of the type of data representation and description specified by the user.

In one embodiment, the given API function producing the view 74 (e.g., FIG. 6) determines, from metadata included in the multidimensional response, that a reference level 76 applies for a given set of members (i.e., particular element in a dimension) and includes this reference level in the simplified response. Such reference levels are not part of the multidimensional space; that is, the reference levels are stored outside of the dimensional model 28 and only reference the multidimensional space.

In brief, each reference level is defined by a reference level set. A reference level set can define multiple references levels. The sets of reference levels can be made available to the reporting system by being stored in a relational database. In general, a reference level set identifies the cube with which a particular reference level is associated, a set of members that need to be matched for the particular reference level to be applied (a reference level can be attached to any combination of members within a given cube), and the reference level value to apply. This reference level value is returned in the query response if the specified set of members matches the set of members in the query.

For example, consider a reference level set comprised of a cube identified as "CT Dose", a set of members to match to be "Target Region: Head" and "Device/Model: Bright Speed," and a reference level value of CTDIvol Mean=100. This reference level value of 100 is returned with the query response if any row is filtered or grouped on both "Head" and "Bright Speed".

In one embodiment, to accommodate reference levels, extra data columns are added to the multidimensional query related to the un-internationalized member names for all member ancestors of grouping dimensions and all member ancestors for filter dimensions. The query is then performed normally. The result is extracted from these extra data columns. The values of the extra data columns are compared to each reference level. If a reference level matches (i.e., satisfies the set of members criterion), the reference level is added to the query response for the cell that it matches. If the same reference level matches for an entire column, the reference level is presented in a global scope (i.e., one reference level for all data reported); otherwise, the reference level is presented for the particular cell.

The user interface 22 presents this reference level 76 in the presented view (e.g., as a horizontal line for a bar chart or a vertical line for a histogram). The reference level feature is an optional embodiment; the query API 24 can operate without this feature.

Figure 10:
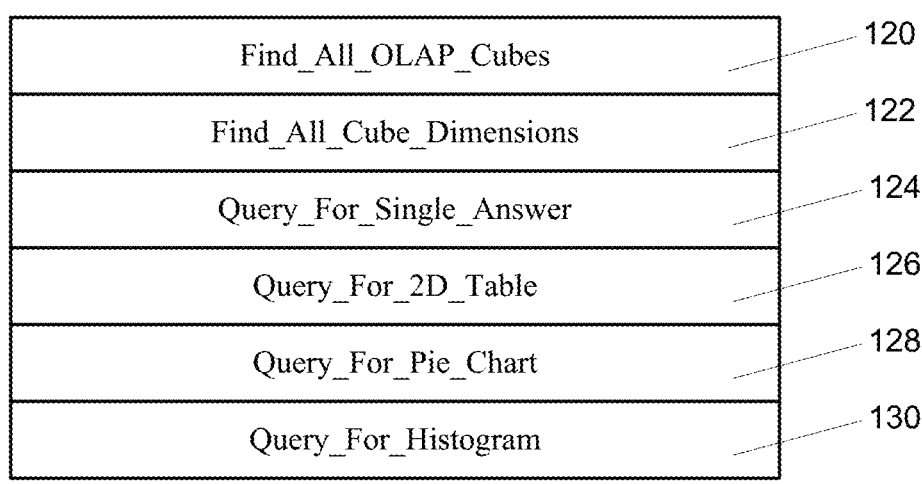
FIG. 10 is a diagram representation of an application program interface (API) of the reporting system used to convert from user-selected report parameter to multidimensional search queries.

FIG. 10 shows an embodiment of the query API 24 of the reporting system. In general, the data analysis program 20 uses the query API 24 to convert from user-selected report parameters to multidimensional search queries (e.g., in the MDX query language). The query API 24 includes the following functions: a Find_All_OLAP_Cubes function 120; a Find_All_Cube_Dimensions function 122; a Query_For_Single_Answer function 124; a Query_For_2D_Table function 126; a Query_For_Pie_Chart function 128, and a Query_For_Histogram function 130.

The Find_All_OLAP_Cubes API function 120 returns a list of all known schemas and cubes. In response to presenting the first step to the user, the user interface 22 uses this information to find the data sources 12 available for the report generation. The Find_All_Cube_Dimensions API function 122 provides the user interface 22 with information about the structure of a given cube. The user interface 22 calls this particular function when presenting the second step to the user. With a schema name and cube name as input parameters, this query API function returns a human-readable cube caption (name), a list of all measures defined for the cube and their supported aggregations, and a list of all dimensions defined for the cube. Each dimension in the list includes a list of all defined hierarchies, specifically the hierarchy of level names (from the cube definition) and the hierarch of all members (acquired from a relational database through the OLAP server 26).

The Query_For_Single_Answer API function 124 provides a mechanism for calculating a single value. Although generally not used by the user interface 22, this API function 124 provides backend operations in support of other API function called by the user interface 22, as subsequently described in more detail. This API function 124 takes, as input parameters, a schema name, cube name, an aggregation (measure and aggregation type), and, optionally, a member filter. The output of this API function 124 is a calculated aggregation across all members that match the filter conditions.

The Query_For_2D_Table API function 126 provides a mechanism for calculating a table of related results, for example, a bar chart, a line chart. Input parameters to this API function 126 includes a schema name, a cube name, a list of columns comprised of aggregation (containing measure and aggregation type) and text selection (dimension and level or property), row selection (members or member ranges), optional member filters, and optional row aggregation filters. The output produced by this API function 126 is a two-dimensional result having columns representing each text selection and aggregation, rows representing each member from the row selection matching the member filters, and a calculated value in each cell. Optionally, the output produced by the API function 126 may also include one or more reference levels.

The Query_For_Pie_Chart API function 128 provides a mechanism to calculate proportions of a total (used to generate a pie chart). The parameters supplied as input to this API function 128 includes a schema name, a cube name, one measure name only, slice selections (members or member ranges), and optional member filters. The output is a two-dimensional result having columns representing each slice name and measure, an additional column for the proportion of the total represented by the slice, rows representing each member from the slice selection matching the member filters, and a calculated value in each cell.

The Query_For_Histogram API function 130 provides a mechanism to calculate the distribution of events in a cube (used to generate a histogram). The parameters supplied as input to this API function 130 includes a schema name, a cube name, a measure name, optional number of steps, step size and minimum value, and optional member filters. The output is a complex result comprised of statistical information about the resulting data set (i.e., standard deviation, minimum value, maximum value, quartiles, mean and median), the selected bin size, and a list containing a value (or count) for each bin. Optionally, the output produced by the API function 130 may also include one or more reference levels.

For each API functions performing a calculation (i.e., API functions 124, 126, 128, and 130), there is a direct mapping between the input parameters 140 and a generated multidimensional search query 142. In each of the following query examples, the multidimensional search query is an MDX query 142.

Figure 11A:
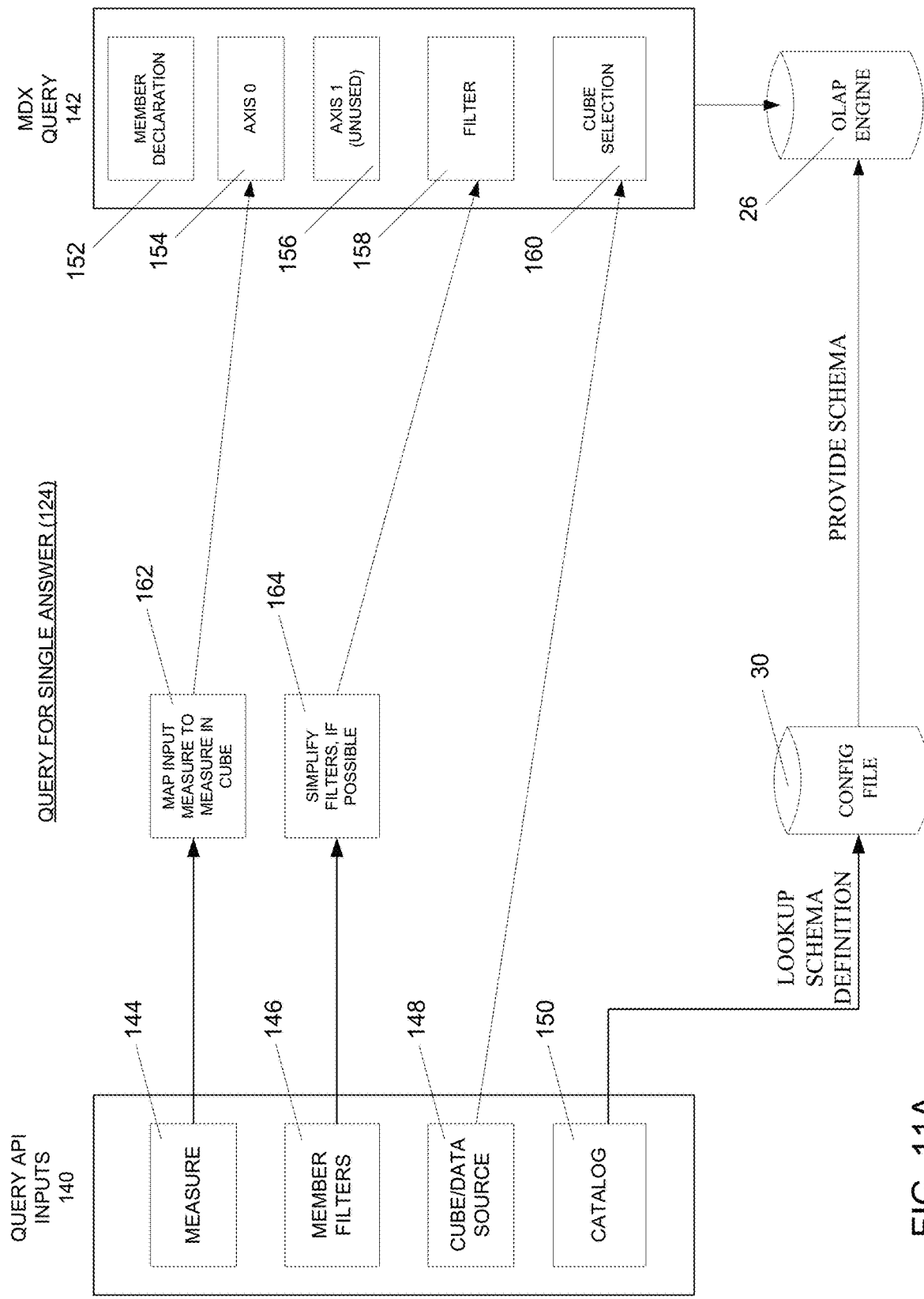
FIG. 11A is a diagram representing a mapping of an API function, referred to as Query_For_Single_Answer, to a multidimensional search query used to query an On-line Analytical Processing (OLAP) database.

FIG. 11A shows an example of the mapping of API input parameters 140 of the Query_For_Single_Answer API function 124 to a multidimensional search query 142. The API input parameters 140 include a measure 144, optional member filters 146, cube/data source 148, and a catalog 150. The search query produced by the API function 124 includes a member declaration 152, an axis (0) 154, an optional filter 158, and a cube selection 160. The axis (0) parameter 154 takes its value from the inputted measure 144, the optional filter 158 from any inputted filters 146, and the cube selection 160 from the inputted cube/data source 148.

Operations performed by the API function 124 to produce the query from these inputs 140 include mapping (step 162) the inputted measure 144 to a measure of the cube, simplifying (step 164) the inputted filters 146, if any, using the input catalog parameter 150 to look up a schema from the configuration file 30, and providing this schema to the OLAP engine 26 together with the resulting multidimensional search query 142.

Responses to each of the calculation API functions (i.e., API functions 124, 126, 128, and 130) are multidimensional (2-D, 3-D, or greater). Each query response 170 is mapped to a simplified API response 172. In each of the following response examples, the multidimensional response is an MDX response 170, which is mapped to one or more API outputs 172 returned to the data analysis program 20.

Figure 11B:
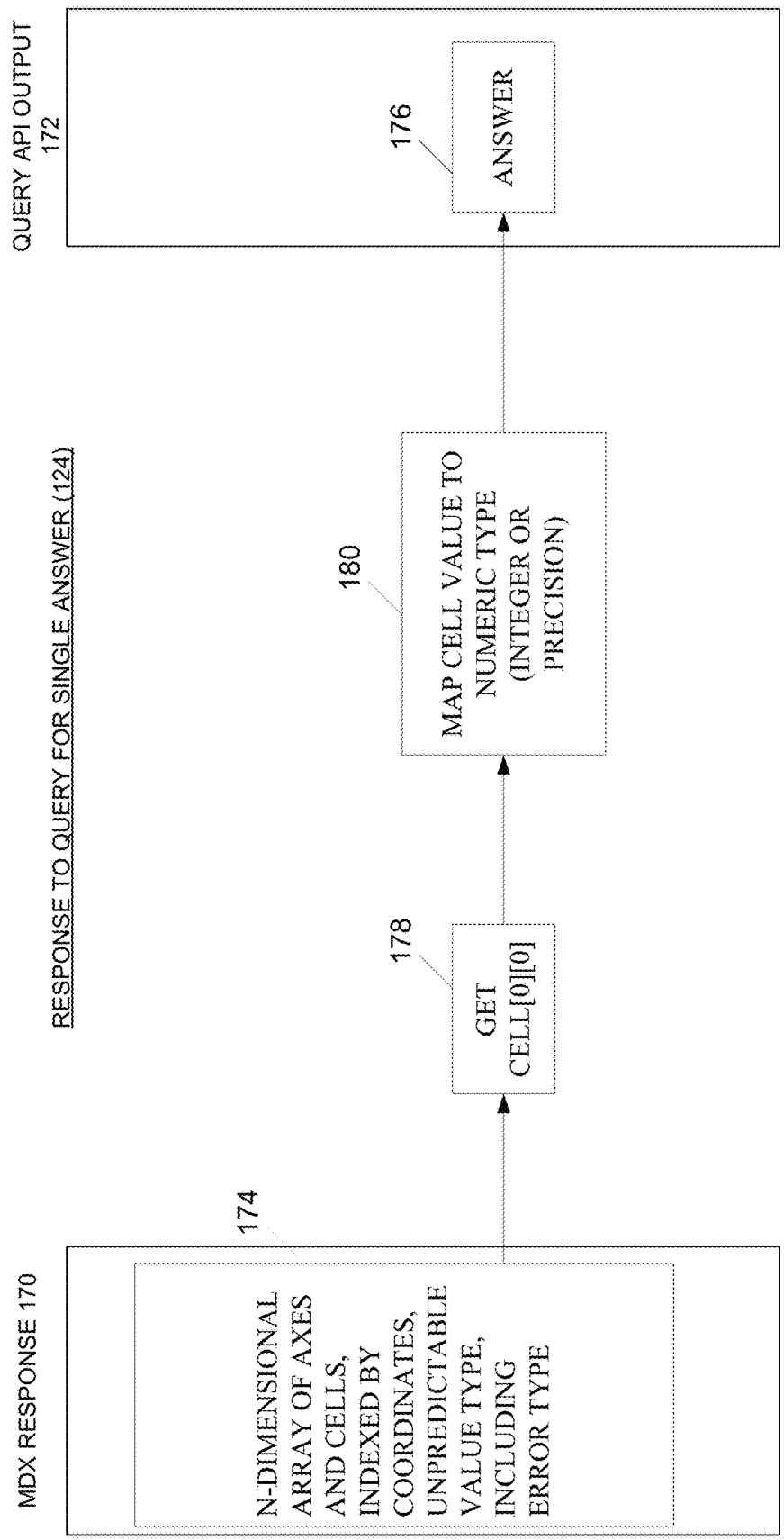
FIG. 11B is a diagram representing a mapping of multidimensional response, produced in response to the Query_For_Singl_Answer search query, to an API output.

FIG. 11B shows a mapping of multidimensional response 170, produced in response to the search query based on the Query_For_Singl_Answer function 124, to an API output 172. The multidimensional response 170 includes an N-dimensional array 174 of axes and cells, indexed by coordinates, each with unpredictable value type, which may be an error type. From this N-dimensional array 174, the Query_For_Single_Answer function 124 produces an answer 176. To produce this answer 176, this API function 124 gets (step 178) the value from a designated cell of the array. The generation of the multidimensional response 170 is crafted such that the position of the data in the array 174 is known beforehand. The API function 124 then maps (step 180) the cell value to its appropriate numeric type (e.g., integer, precision).

Figure 12A:
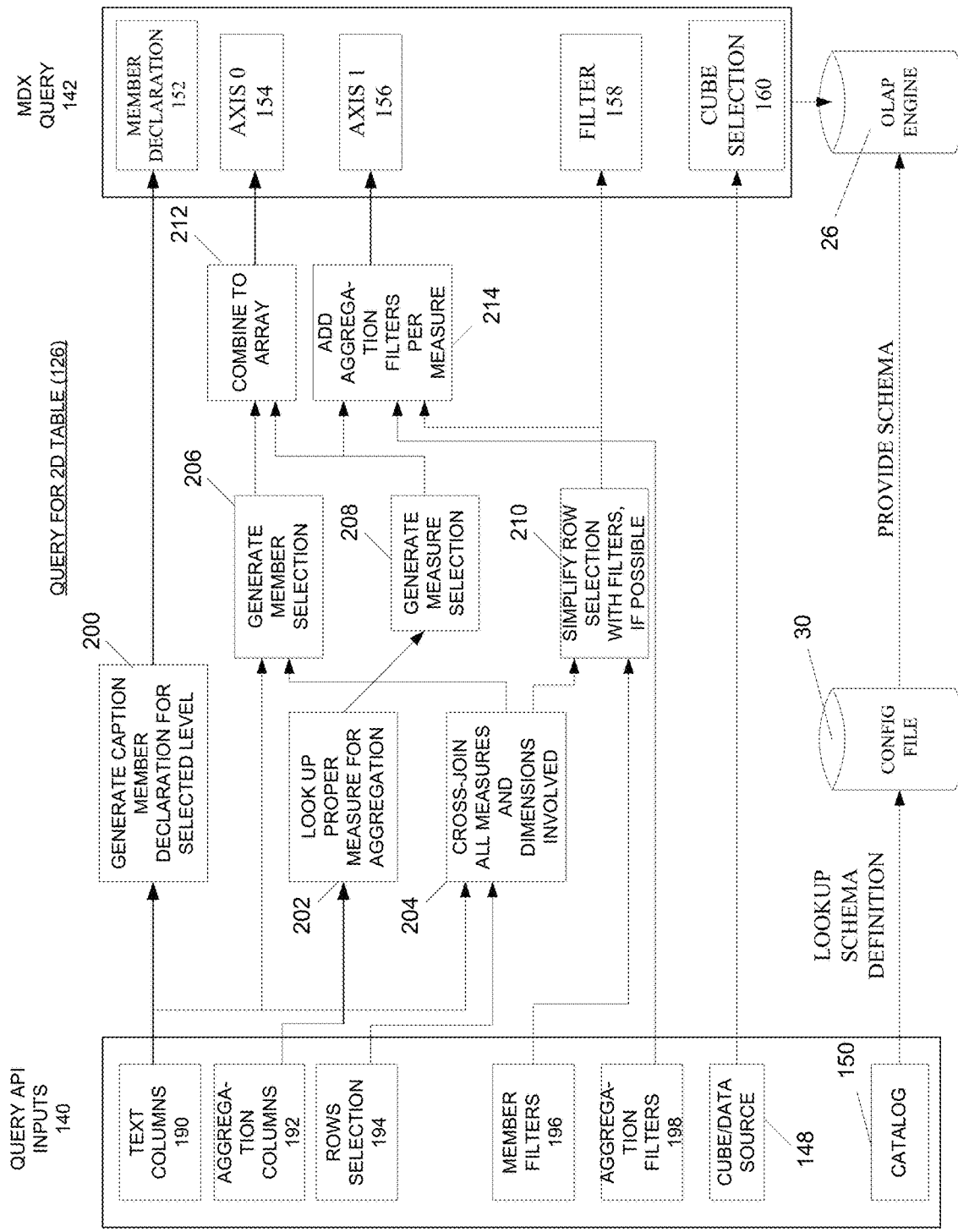
FIG. 12A is a diagram representing a mapping of an API function, referred to as Query_For_2D_Table, to a multidimensional search query.

FIG. 12A shows a mapping performed by the Query_For_2D_Table API function 126 of inputted parameters 140 to a multidimensional search query 142. These API input parameters 140 include a text column 190, aggregation columns 192, row selection 194, optional member filters 196, aggregation filters 198, a cube/data source 148, and a catalog 150. The search query produced by the API function 126 includes a member declaration 152, an axis (0) 154, an axis (1) 156, an optional filter 158, and a cube selection 160.

To produce the query from these inputs 140, the API function 126 generates (step 200) the member declaration 152 from the inputted text column 190. The API function 126 looks up (step 202) the proper measure for the aggregation based on the inputted aggregation columns 192 and cross-joins (step 204) all involved measures and dimensions based on inputted text column 190 and row selection 194. From the inputted text column 190 and the results of the cross-join (step 204), the API function 126 generates (step 206) a member selection. The generation of the measure selection (step 208) derives from the look-up (step 202) of the proper measure for the aggregation. The member selection (step 206) and measure selection (step 208) are combined (step 212) to produce an array. The axis (0) 154 of the query 142 acquires its information from this array.

The API function 126 also simplifies (step 210) the row selection 194, based on any provided member filters 196 and the cross-join results (step 204). The filter term 158 of the query 142 takes its value from the simplified row selection (step 210). In addition, the API function 126 adds (step 214) aggregation filters for each measure, based on inputted aggregation filters 198, the measure selection (step 208), and the simplified row selection (step 210). The axis (1) 156 of the search query 142 acquires its information from the selection of measures (with added aggregations).

Additional operations performed by the API function 126 include mapping the inputted cube/data source 148 to the cube selection 160 portion of the query 142, looking up a schema from the configuration file 30 using the input catalog parameter 150, and providing this schema to the OLAP engine 26, together with the resulting multidimensional search query 142.

Figure 12B:
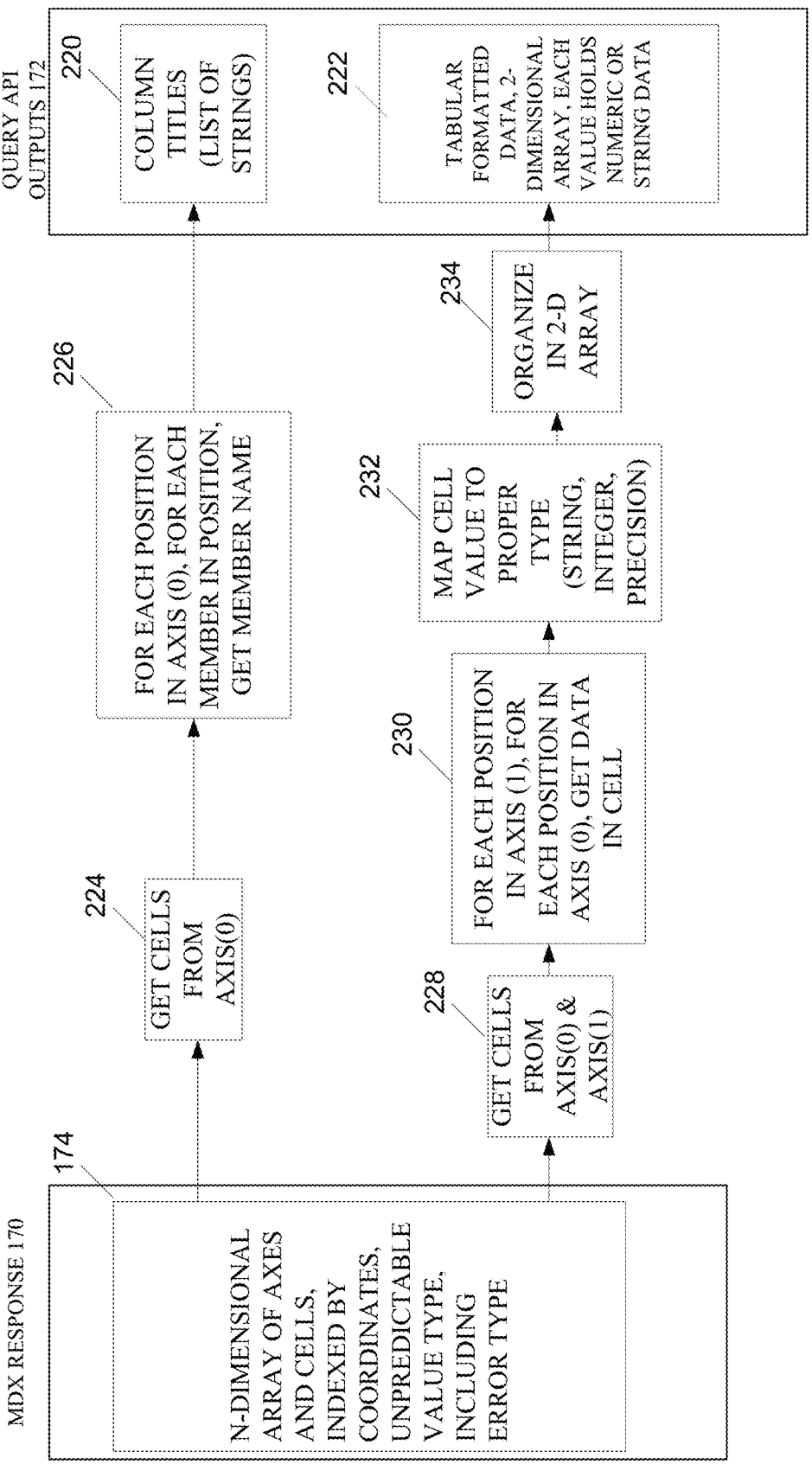
FIG. 12B is a diagram representing a mapping of multidimensional response, produced in response to the Query_For_2D_Table search query, to API outputs.

FIG. 12B shows a mapping of multidimensional response 170, produced in response to the search query based on the Query_For_2D_Table API function 126, to API outputs 172. The multidimensional response 170 includes an N-dimensional array 174 of axes and cells, indexed by coordinates, each with unpredictable value type, which may be an error type. From this N-dimensional array 174, the Query_For_2D_Table function 126 produces column titles 220 and a two-dimensional array 222.

To produce the column titles 220, this API function 126 gets (step 224) cells from axis (0) in the N-dimensional array. For each position in axis (0), for each member in a position, the API function 126 acquires (step 226) the member name. The acquired member names correspond to the column titles 220.

To produce the two-dimensional array 222, the Query_For_2D_Table API function 126 gets (step 228) the cells from the axis (0) and axis (1) portions of the N-dimensional array 174. For each position in axis (1) and for each position in axis (0), the Query_For_2D_Table API function 126 acquires (step 230) the data in the cell. The API function 126 then maps (step 232) the cell data to its appropriate numeric type (e.g., integer, precision) and organizes (step 234) the cell data into a 2-D array to produce the two-dimensional array 222 with tabular-formatted data.

Figure 13A:
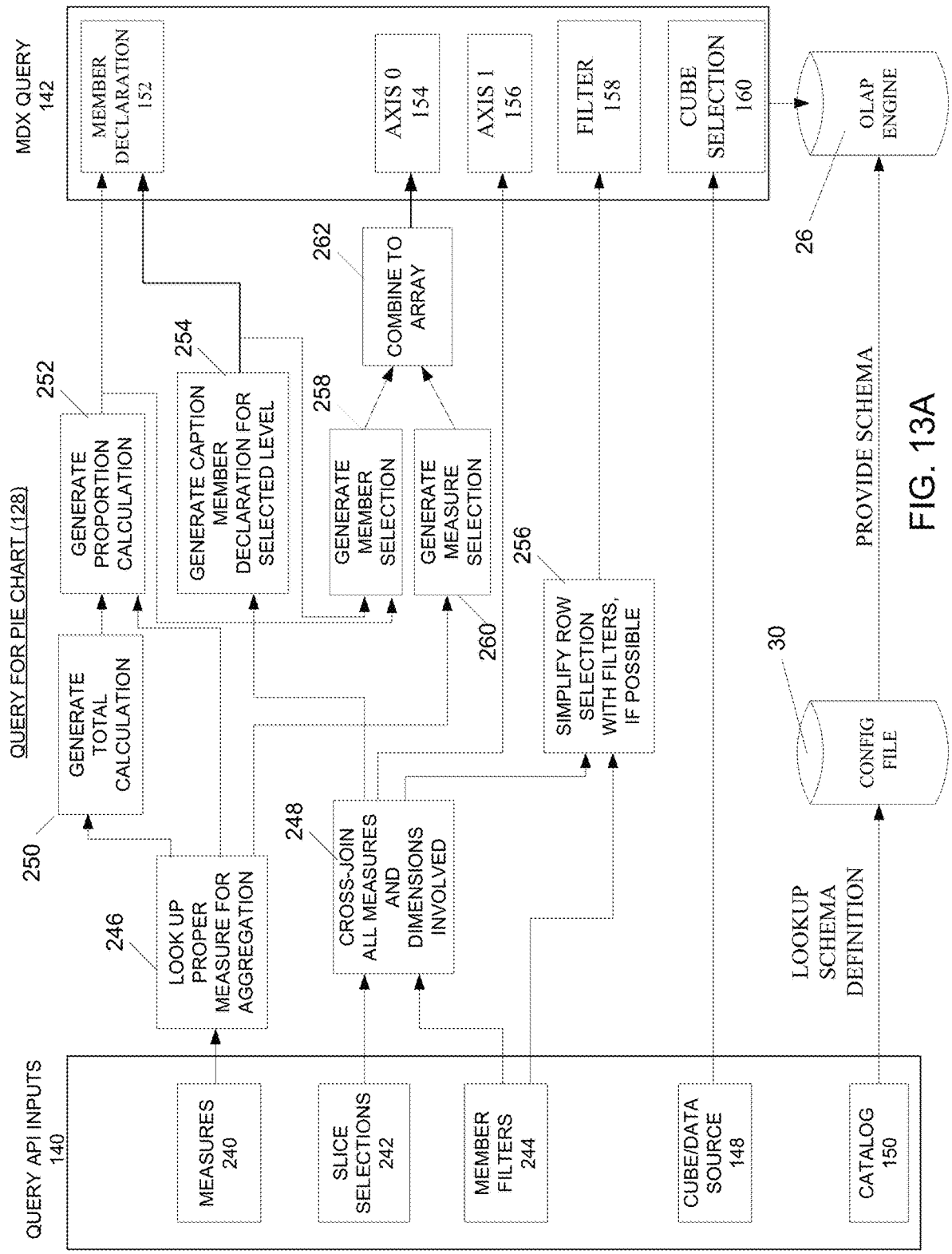
FIG. 13A is a diagram representing a mapping of an API function referred to as Query_For_Pie_Chart to a multidimensional search query.

FIG. 13A shows a mapping of inputted parameters 140 to a multidimensional search query 142 performed by the Query_For_Pie_Chart API function 128. These API input parameters 140 include measures 240, slice selections 242, optional member filters 244, a cube/data source 148, and a catalog 150. The search query 142 produced by the API function 128 includes a member declaration 152, an axis (0) 154, an axis (1) 156, an optional filter 158, and a cube selection 160. The API function 128 maps the inputted cube/data source 148 to the cube selection 160 portion of the query 142 and uses the inputted catalog parameter 150 to look up a schema from the configuration file 30. This schema is provided to the OLAP engine 26 with the multidimensional search query 142.

To produce the particular terms of the search query 142, the API function 128 looks up (step 246) the proper measure for aggregation based on the inputted measures 240 and cross-joins (step 248) all involved measures and dimensions based on inputted slice selections 242 and member filters 244. From the look-up (step 246) of the proper measure for the aggregation, the API function 128 generates (step 250) a total calculation. A proportion calculation is generated (step 252) from this total calculation (step 250) and from the look-up (step 246) of the proper measure for the aggregation.

The API function 128 also generates (step 254) caption member declaration for a selected level based on the cross-join results (step 248). The member declaration 152 of the search query 142 derives its information from the proportion calculation (step 252) and the generated caption member declaration (step 254).

The API function 128 also simplifies (step 256) the row selection, if possible, based on any provided member filters 244 and the cross-join results (step 248). The filter term 158 of the query 142 acquires its information from the simplified row selection (step 256). From the proportion calculation (step 252) and the caption member declaration (step 254), the API function 128 generates (step 258) a member selection. The generation of the measure selection (step 260) derives from the look-up (step 246) of the proper measure for the aggregation. The member selection (step 258) and measure selection (step 260) are combined (step 262) to produce an array. The axis (0) 154 of the query 142 acquires its information from this array. In addition, the axis (1) 156 of the search query 142 acquires its information from the cross-join results (step 248).

Figure 13B:
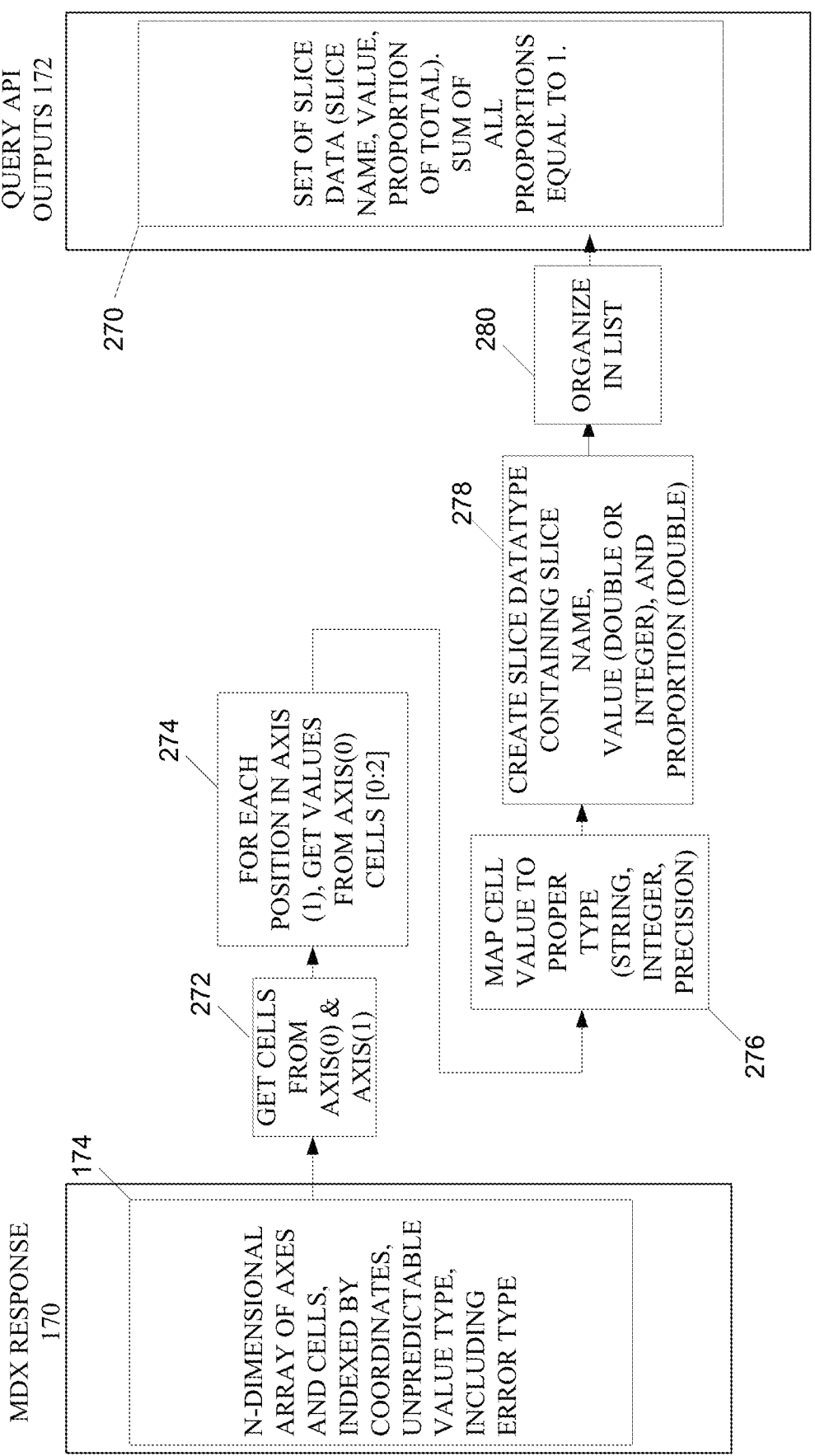
FIG. 13B is a diagram representing a mapping of multidimensional response, produced in response to the Query_For_Pie_Chart search query, to an API output.

FIG. 13B shows a mapping of a multidimensional response 170 to an API output 172, produced in response to the search query based on the Query_For_Pie_Chart function 128. The multidimensional response 170 includes an N-dimensional array 174 of axes and cells, indexed by coordinates, each with unpredictable value type, which may be an error type. From this N-dimensional array 174, the Query_For_Pie_Chart function 128 produces a set of slice data 270. Each set of slice data 170 includes a slice name, value, and proportion of total. The sum of all proportions (of all slices) is equal to 1.

To produce a set of slice data 270, the Query_For_Pie_Chart API function 128 gets (step 272) the cells from the axis (0) and axis (1) portions of the N-dimensional array 174. For each position in axis (1), the Query_For_Pie_Chart API function 128 gets (step 274) values from axis (0) cells. The API function 128 then maps (step 276) each acquired cell value to its appropriate numeric type (e.g., string, integer, precision), generates (step 278) slice data type containing a slice name, value (double or integer), and proportion (double), and organizes (step 280) the values into a list. The Query_For_Pie_Chart API function 128 returns these API outputs 172 to the calling application program (e.g., data analysis program 20), which generates a view (fourth step of the wizard process) showing a pie chart drawn in accordance with the information provided by the API outputs 172.

Figure 14A:
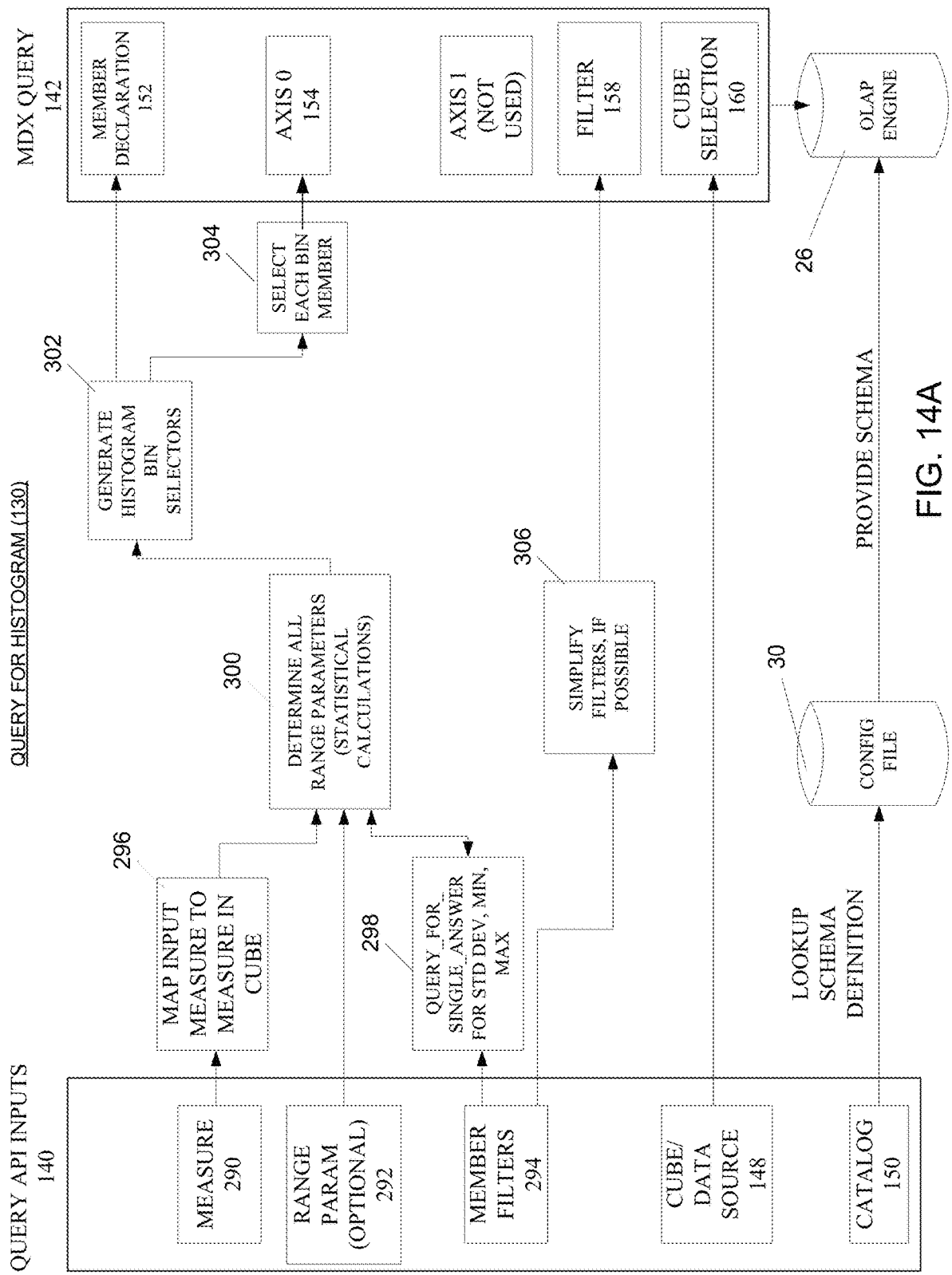
FIG. 14A is a diagram representing a mapping of an API function referred to as Query_For_Histogram, to a multidimensional search query.

FIG. 14A shows an example of the mapping of API input parameters 140 to a multidimensional search query 142 performed by the Query_For_Histogram API function 130. The API input parameters 140 include a measure 290, an optional range parameter 292, optional member filters 294, a cube/data source 148, and a catalog 150. The search query produced by the API function 130 includes a member declaration 152, an axis (0) 154, an optional filter 158, and a cube selection 160. The API function 130 maps the inputted cube/data source 148 to the cube selection 160 portion of the query 142 and uses the inputted catalog parameter 150 to look up a schema from the configuration file 30. This schema is provided to the OLAP engine 26 with the multidimensional search query 142.

The API function 130 maps (step 296) the inputted measure 290 to a measure of a cube. In addition, the API function 130 calls (step 298) the Query_For_Single_Answer API function 124 three times: once to acquire a value for the standard deviation, once to acquire a minimum value, and once to acquire a maximum value. The statistical values for all range calculations are determined (step 300) from the mapped measure of the cube, the inputted range parameters 292, and the values (step 298) calculated for the standard deviation, minimum, and maximum. Histogram bin selectors are generated (step 302) from the determined statistical calculations (step 300). The member declaration 152 of the search query acquires its information from these histogram bin selectors (step 302). In addition, each bin member is selected (step 304) from the histogram bin selectors (step 302). The axis (0) 154 of the search query acquires its information from the selected bin members (step 304). The API function 130 also simplifies (step 306) the member filters 294, if possible. The filter term 158 of the query 142 acquires its information from the simplified filters (step 306).

Figure 14B:
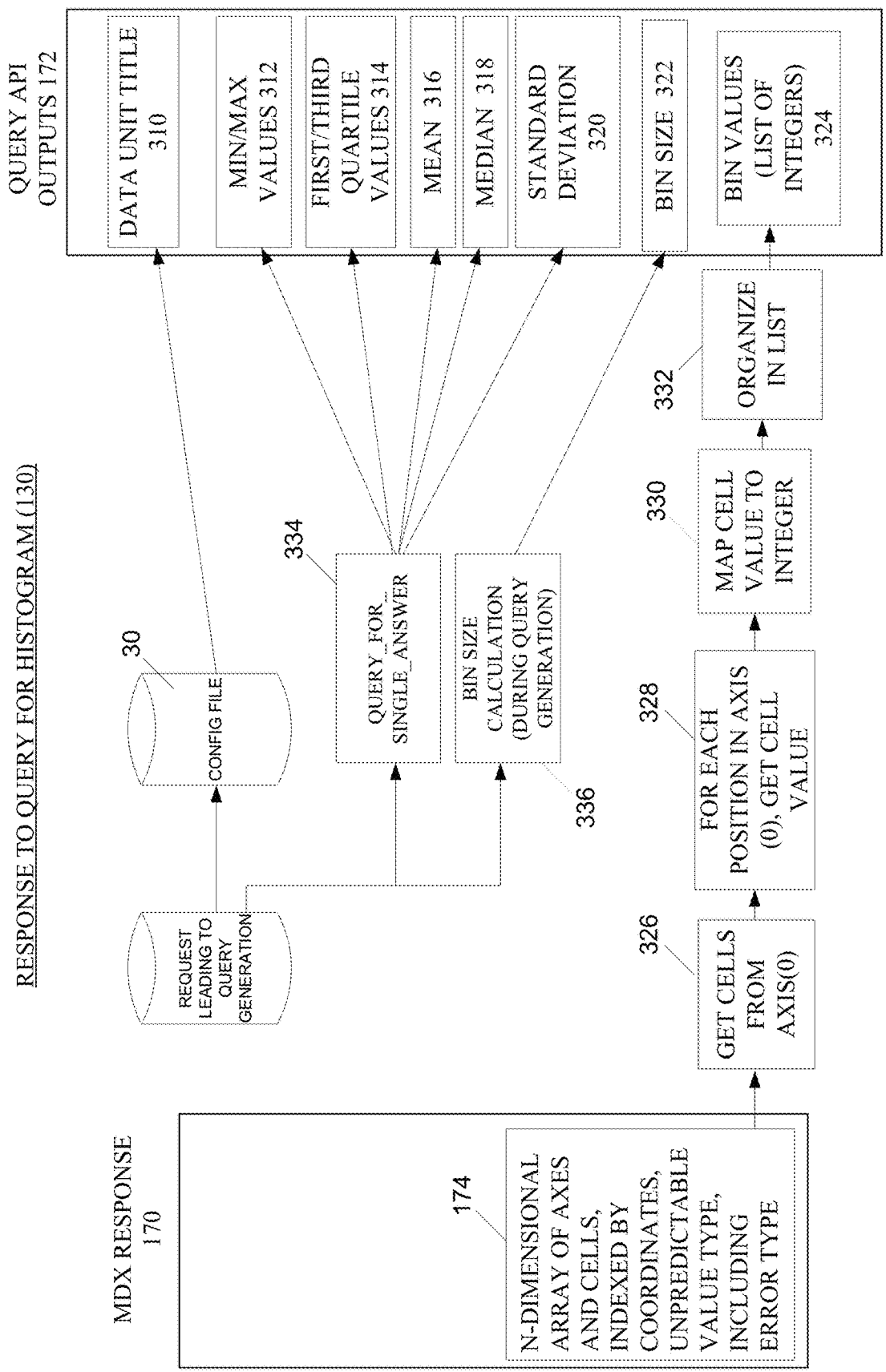
FIG. 14B is a diagram representing a mapping of multidimensional response, produced in response to the Query_For_Histogram search query, to API outputs.

FIG. 14B shows a mapping of a multidimensional response 170 to API outputs 172, produced in response to the search query based on the Query_For_Histogram API function 130. The API outputs 172 include a data unit title 310, minimum and maximum values 312, first and third quartile values 314, a mean value 316, a median value 318, a standard deviation value 320, bin size 322, and bin values 324. These bin values 324 are structured as a list of integers. The multidimensional response 170 includes an N-dimensional array 174 of axes and cells, indexed by coordinates, each with unpredictable value type, which may be an error type.

The Query_For_Histogram API function 130 produces the bin values 324 (part of the API output 172) from this N-dimensional array 174 by getting (step 326) the cells from the axis (0) portion of the N-dimensional array 174, and for each position in axis (0), gets (step 328) a cell value. The API function 130 then maps (step 330) each cell value to an integer and organizes (step 332) the values into a list, which serves for the bin values 324.

To produce the other API outputs 172, namely, the data unit title 310, minimum and maximum values 312, first and third quartile values 314, mean value 316, median value 318, standard deviation value 320, and bin size 322, the API function 130 uses information acquired by performing other API functions or calculated during the query generation. The data unit title 310 acquires its information from a lookup of the configuration file 30. The configuration file 30 defines a basic unit to be used for generating histograms and which measure of the cube supplies this basic unit. The minimum and maximum values 312, first and third quartile values 314, mean value 316, median value 318, and standard deviation value 320 are determined from calls (step 334) to the Query_For_Single_Answer API function 124. The bin size 322 can be calculated (step 336) during search query generation, for example, from the statistical calculations (step 300, FIG. 14A).

The Query_For_Histogram API function 130 returns these API outputs 172 to the calling application program (e.g., data analysis program 20). The application 20 generates a view (fourth step of the wizard process) showing a histogram drawn in accordance with the information provided by the API outputs 172.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method to analyze biometric or medical data, comprising:
   receiving, from an input device, a user-specified selection of a data source, the data source including the biometric or medical data;
   receiving, from the input device, a user-specified selection of a type of data representation;
   receiving, from the input device, a user-specified description of a view to be constructed in accordance with the user-specified selection of the type of data representation;
   generating, by an application program interface (API) function, processor and memory, a multidimensional query based on the user-specified type of data representation and the user-specified description of the view to be constructed;
   submitting, by the API function, the multidimensional query to an On-line Analytical Processing (OLAP) server for searching the data source;
   receiving, by the application program interface (API) function, processor and memory, at least a multidimensional response from the OLAP server containing results obtained based on the multidimensional query of the data source;
   simplifying, by the application program interface (API) function, processor and memory, the multidimensional response, the simplifying of the multidimensional response including the API function mapping dimensional modeling terminology of the multidimensional response into non-multidimensional terminology compatible with a user interface, the simplified multidimensional response including at least one reference level corresponding to a target region in the biometric or medical data, the at least one reference level not being a part of the multidimensional space and being defined by a reference level set which identifies a cube with which a particular reference level is associated and a set of members that need to be matched for the at least one reference value to apply and a reference level value; and
   generating the view, for display on the user interface, based on the results contained in the simplified multidimensional response and in accordance with the user-specified selection of the type of data representation and the user-specified description of the view, the view further providing context of the data to the user usable to trigger an alert.

2. The method of claim 1, wherein the user-specified selection of a type of data representation includes one or more of a pie chart, histogram, bar chart, line chart, donut chart, or table.

3. The method of claim 1, wherein the user-specified description of the view to be constructed includes one or more measures selected for presentation and one or more group dimensions for grouping values associated with the selected measures.

4. The method of claim 1, further comprising:
   determining that a reference level is available for a user-specified description of the view; and
   presenting the reference level with the search results within the presented view.

5. The method of claim 1, further comprising defining a schema with a set of cubes, each cube defining one or more dimensions and one or more measures, at least one measure of a given cube being represented multiple times in the given cube, each representation corresponding to a different possible aggregation of that measure.

6. The method of claim 1, further comprising providing a configuration file that defines a basic unit of a cube for use generating histograms and a measure that provides the basic unit.

7. The method of claim 1, further comprising calculating a table of related results for use in constructing line chart and bar chart data representations.

8. The method of claim 1, further comprising calculating proportions of a total amount for use in constructing pie chart and donut chart data representations.

9. The method of claim 1, further comprising calculating a distribution of events in a cube for use in a histogram.

10. A non-transitory computer readable information storage medium having stored thereon computer readable program code, the computer readable program code comprising instructions to perform a method comprising:

receiving, from an input device, a user-specified selection of a data source, the data source including the biometric or medical data;

receiving, from the input device, a user-specified selection of a type of data representation;

receiving, from the input device, a user-specified description of a view to be constructed in accordance with the user-specified selection of the type of data representation;

generating, by an application program interface (API) function, processor and memory, a multidimensional query based on the user-specified type of data representation and the user-specified description of the view to be constructed;

submitting, by the API function, the multidimensional query to an On-line Analytical Processing (OLAP) server for searching the data source;

receiving, by the application program interface (API) function, processor and memory, at least a multidimensional response from the OLAP server containing results obtained based on the multidimensional query of the data source;

simplifying, by the application program interface (API) function, processor and memory, the multidimensional response, the simplifying of the multidimensional response including the API function mapping dimensional modeling terminology of the multidimensional response into non-multidimensional terminology compatible with a user interface, the simplified multidimensional response including at least one reference level corresponding to a target region in the biometric or medical data, the at least one reference level not being a part of the multidimensional space and being defined by a reference level set which identifies a cube with which a particular reference level is associated and a set of members that need to be matched for the at least one reference value to apply and a reference level value; and generating the view for display on the user interface based on the results contained in the simplified multidimensional response and in accordance with the user-specified selection of the type of data representation and the user-specified description of the view, the view further providing context of the data to the user usable to trigger an alert.

11. The media of claim 10, wherein the user-specified selection of a type of data representation includes one or more of a pie chart, histogram, bar chart, line chart, donut chart, or table.

12. The media of claim 10, wherein the user-specified description of the view to be constructed includes one or more measures selected for presentation and one or more group dimensions for grouping values associated with the selected measures.

13. The media of claim 10, further comprising:
computer readable program code that, if executed, determines that a reference level is available for a user-specified description of the view;
computer readable program code that, if executed, presents the reference level with the search results within the presented view.

14. The media of claim 10, further comprising computer readable program code that, if executed, defines a schema with a set of cubes, each cube defining one or more dimensions and one or more measures, at least one measure of a given cube being represented multiple times in the given cube, each representation corresponding to a different possible aggregation of that measure.

15. The media of claim 10, further comprising computer readable program code that, if executed, provides a configuration file that defines a basic unit of a cube for use generating histograms and a measure that provides the basic unit.

16. The media of claim 10, further comprising computer readable program code that, if executed, calculates a table of related results for use in constructing line chart and bar chart data representations.

17. The media of claim 10, further comprising computer readable program code that, if executed, calculates proportions of a total amount for use in constructing pie chart and donut chart data representations.

18. The media of claim 10, further comprising computer readable program code that, if executed, calculates a distribution of events in a cube for use in a histogram.

19. A computer system for analyzing data, the computer system comprising:
a non-transitory memory storing program code used for analyzing data and generating reports;
a processor, in communication with memory, executing the program code to:
receive, from an input device, a user-specified selection of a data source, the data source including the biometric or medical data;
receive, from the input device, a user-specified selection of a type of data representation;
receive, from the input device, a user-specified description of a view to be constructed in accordance with the user-specified selection of the type of data representation;
generate, by an application program interface (API) function, processor and memory, a multidimensional query based on the user-specified type of data representation and the user-specified description of the view to be constructed;
submit, by the API function, the multidimensional query to an On-line Analytical Processing (OLAP) server for searching the data source;
receive, by the application program interface (API) function, processor and memory, at least a multidimensional response from the OLAP server containing results obtained based on the multidimensional query of the data source;
simplify, by the application program interface (API) function, processor and memory, the multidimensional response, the simplifying of the multidimensional response including the API function mapping dimensional modeling terminology of the multidimensional response into non-multidimensional terminology compatible with a user interface, the simplified multidimensional response including at least one reference level corresponding to a target region in the biometric or medical data, the at least one reference level not being a part of the multidimensional space and being defined by a reference level set which identifies a cube with which a particular reference level is associated and a set of members that need to be matched for the at least one reference value to apply and a reference level value; and
generate the view based on the results contained in the multidimensional response and in accordance with the user-specified selection of the type of data representation and the user-specified description of the view, the view further providing context of the data to the user usable to trigger an alert.

20. The computer system of claim 19, wherein the query API includes one or more of:
- an API function for calculating a table of related results for use in constructing line chart and bar chart data representations,
- an API function for calculating proportions of a total amount for use in constructing pie chart and donut chart data representations, and/or
- an API function for calculating a distribution of events in a cube for use in a histogram.

* * * * *